(12) United States Patent
Core et al.

(10) Patent No.: US 11,841,345 B2
(45) Date of Patent: Dec. 12, 2023

(54) METHODS AND APPARATUSES FOR PREDICTING AND USING ONE OR MORE RESONANCE FREQUENCIES FOR EFFICIENT OPERATION OF AN ACOUSTOFLUIDIC CAVITY

(71) Applicant: ACOUSORT AB, Lund (SE)

(72) Inventors: Giulia Core, Bologna (IT); Valentina Vitali, Pully (CH); Fabio Garofalo, Malmo (SE); Thomas Laurell, Lund (SE); Andreas Lenshof, Lund (SE)

(73) Assignee: ACOUSORT AB, Lund (SE)

( * ) Notice: Subject to any disclaimer, the term of this patent is extended or adjusted under 35 U.S.C. 154(b) by 402 days.

(21) Appl. No.: 17/270,803

(22) PCT Filed: Aug. 26, 2019

(86) PCT No.: PCT/EP2019/072732
§ 371 (c)(1),
(2) Date: Feb. 23, 2021

(87) PCT Pub. No.: WO2020/039102
PCT Pub. Date: Feb. 27, 2020

(65) Prior Publication Data
US 2021/0262989 A1    Aug. 26, 2021

(30) Foreign Application Priority Data
Aug. 24, 2018  (EP) .................................. 18190863

(51) Int. Cl.
*G01N 29/22* (2006.01)
*B01L 3/00* (2006.01)
*G01N 29/34* (2006.01)

(52) U.S. Cl.
CPC ...... *G01N 29/222* (2013.01); *B01L 3/502761* (2013.01); *G01N 29/348* (2013.01); *B01L 2400/0436* (2013.01)

(58) Field of Classification Search
CPC ............. G01N 29/222; G01N 29/348; G01N 29/4472; B01L 3/502761;
(Continued)

(56) References Cited

U.S. PATENT DOCUMENTS

2016/0332159 A1* 11/2016 Dual .................. B01F 33/3021

FOREIGN PATENT DOCUMENTS

EP    3184624    6/2017

OTHER PUBLICATIONS

International Search Report on corresponding PCT application (PCT/EP2019/072732) from International Searching Authority (EPO) dated Nov. 18, 2019.
(Continued)

*Primary Examiner* — Tarun Sinha
(74) *Attorney, Agent, or Firm* — SHORE IP GROUP, PLLC; Howard J. Klein

(57) ABSTRACT

A method of predicting one or more resonance frequencies for efficient operation of an acoustofluidic cavity in an acoustofluidic device is provided. The method comprises the steps of i. providing a first liquid filling the cavity, ii. obtaining a first impedance spectrum, by measuring the electrical impedance of an ultrasound transducer connected to the acoustofluidic device as the transducer is driven at a range of frequencies, iii. providing a second liquid filling the cavity, wherein the second liquid differs from the first liquid in its acoustophysical properties, iv. obtaining a second impedance spectrum, by measuring the electrical impedance of the ultrasound transducer as the ultrasound transducer is driven at the range of frequencies, and v. predicting the one
(Continued)

or more resonance frequencies for efficient operation of the acoustofluidic cavity by comparing the first and second impedance spectrum and selecting the one or more frequencies where the absolute value of the difference between the spectra, normalized by the absolute value of one of them, is largest. A method of driving an acoustofluidic device and apparatuses for predicting resonance frequencies and performing acoustofluidic operations are also provided.

23 Claims, 24 Drawing Sheets

(58) Field of Classification Search
CPC ..... B01L 2400/0436; B01L 2200/0652; B01L 2200/12; B01L 2200/148
See application file for complete search history.

(56) References Cited

OTHER PUBLICATIONS

Written Opinion on corresponding PCT application (PCT/EP2019/072732) from International Searching Authority (EPO) dated Nov. 18, 2019.
Dual et al.; "Acoustofluidics 6: Experimental characterization of ultrasonic particle manipulation devices"; Lab on a Chip; vol. 12, No. 5, pp. 852-862; Jan. 1, 2012; XP055554685.

* cited by examiner

METHODS AND APPARATUSES FOR PREDICTING AND USING ONE OR MORE RESONANCE FREQUENCIES FOR EFFICIENT OPERATION OF AN ACOUSTOFLUIDIC CAVITY

CROSS-REFERENCE TO RELATED APPLICATION

This application is the National Phase, under 35 U.S.C. § 371(c), of International Application No. PCT/EP2019/072732, filed Aug. 26, 2019, which claims priority from European Application No. EP 18190863.3, filed Aug. 24, 2018. The disclosures of all of the referenced applications are incorporated herein by reference in their entirety.

FEDERALLY SPONSORED RESEARCH OR DEVELOPMENT

Not Applicable

FIELD OF THE INVENTION

The present invention relates to the field of acoustofluidic devices and methods and apparatuses for predicting and using one or more resonance frequencies for efficient operation of such a device. The methods and apparatuses provide for the automated determination of one or more resonance frequencies of such a device thus allowing rapid, reproducible and precise prediction of a suitable and efficient operation frequency of each acoustofluidic device for use when performing acoustofluidic operations with said device.

BACKGROUND OF THE INVENTION

Acoustofluidic devices include microfluidic acoustofluidic chips comprising acoustofluidic, e.g. microfluidic, cavities such as channels in which a sample liquid can be processed by performing an acoustofluidic operation on the sample liquid. During the acoustofluidic operation ultrasound energy is supplied to the acoustofluidic device including any microfluidic channel or cavity to affect the sample liquid and any particles suspended in the sample liquid. The acoustofluidic operation may be one of separation, i.e. affecting movement of the particles in the sample liquid so that different particles travel different distances in the liquid as a function of how each particles is affected by the ultrasound energy being supplied to the acoustofluidic device. By suitable design of the microfluidic channels or cavities, together with suitable selection of laminar flow of the sample or no-flow conditions, different particles can be moved to different positions and thereafter separated from each other. Other acoustofluidic operations involve driving particles in the sample fluid towards a position, such as the center or walls, of the microfluidic channels or cavities.

During the last decade, acoustofluidic devices have been used for many useful purposes such as exchanging the suspending medium of cells, separation of lipids from blood cells, separation of circulating tumor cells from white blood cells, raw milk control, and plasma separation from whole blood.

Efficient performance of an acoustofluidic operation however requires that the frequency of the ultrasound energy supplied to the acoustofluidic device is selected, i.e. tuned, so that a resonance or standing wave arises in the microfluidic channels or cavities. Thus the operation frequency, i.e. the frequency of the supplied or applied ultrasound, should e.g. match the resonance frequency of the microfluidic channels or cavities.

More specifically, in order to be able to move and spatially localize particles in the liquid sample, resonance must occur in the dimension of the channel or cavity in which the particle is to be moved, e.g. over the width of the channel, over the height of the channel, or both. Typically, the cavity dimension of interest must support an integer number of half wavelengths in the liquid sample, i.e. in the fluid in which the particle is suspended in, thus allowing the formation of a standing wave with well-defined nodes and antinodes. In resonance conditions, particles inside the cavity are affected by acoustic radiation forces that move them towards particular locations in the cavity depending on their acoustophysical properties e.g. density and compressibility. In this way, different particles/cells can be separated or aggregated.

Acoustofluidic operations can be performed during flow of the liquid sample, or in conditions of no flow of the liquid sample.

However, even where the dimensions of the channel or cavity are known, the one-dimensional standing planar acoustic wave approximation, which is often used in design purposes, is not sufficient to precisely determine the acoustic resonance frequency of the channel or cavity in an acoustofluidic device. Thus, even if the width of the channel is a multiple of the wavelength of the ultrasound and the resonance (standing wave) is expected to occur for a specific frequency corresponding to this width, the actual or optimum operation frequency is typically achieved at a different frequency.

This is the reason why the channel or cavity resonance frequency nowadays is commonly found experimentally by visual inspection of particle band formation (in a liquid sample) while manually scanning the frequency over a frequency range encompassing the expected resonance frequency. This method is operator dependent, requires access to costly equipment such as a function generator and microscope, is less precise, may not be reproducible, and is also time consuming. All in all these factors increases costs and limits the production capacity and rate of suitable acoustofluidic devices to use in such instruments.

One attempt to provide an automatic method for determining a suitable resonance frequency involves measuring electrical impedance of an actuating piezoelectric transducer which transforms the electric drive signal into the ultrasound energy supplied to the acoustofluidic device.

J Dual, P Hahn, I Leibacher, D Möller, and T Schwarz. Acoustofluidics 6: Experimental characterization of ultrasonic particle manipulation devices. Lab on a Chip, 12(5):852{862, 2012, suggests measuring the electrical impedance to characterize ultrasonic systems and to find resonance frequencies.

Hammarström, M Evander, J Wahlström, and J Nilsson. Frequency tracking in acoustic trapping for improved performance stability and system surveillance. Lab on a Chip, 14(5):1005{1013, 2014, manages to frequency track a pre-annotated impedance minimum when actuating a simple glass capillary, resulting in efficient acoustic trapping.

F Garofalo, T Laurell, and H Bruus. Performance study of acoustophoretic microfluidic silicon-glass devices by characterization of material- and geometry dependent frequency spectra. Physical Review Applied, 7(5): 054026, 2017, proposes an empirical criterion to identify the correct resonance frequencies in the microchannel of a silicon-glass acoustophoretic device, based on theoretical electromechanical simulations.

None of these approaches have, however, proven to be successful in determining and tuning the operating frequency in an arbitrary acoustofluidic device.

Accordingly, objects of the present invention include the provision of methods and apparatuses for predicting one or more resonance frequencies for efficient operation of a cavity in an acoustofluidic device, and accordingly predicting optimal driving, actuation or operation frequencies or frequency interval, for operating an acoustofluidic device.

The objects of the present invention further comprise providing such methods and apparatuses applicable to simple as well as more complex acoustofluidic devices alike.

Other objects of the present invention include the provision of methods of driving an acoustofluidic device as well as apparatuses comprising acoustofluidic devices which are driven at a frequency based on or derived from one or more predicted resonance frequencies.

SUMMARY OF THE INVENTION

At least one of the above mentioned objectives are, according to the first aspect of the present invention, achieved by method of predicting one or more resonance frequencies for efficient operation of a acoustofluidic cavity, such as a channel, in an acoustofluidic device, the method comprising the steps of
  i. providing a first liquid filling the cavity,
  ii. obtaining a first impedance spectrum, by measuring the electrical impedance of an ultrasound transducer connected to the acoustofluidic device as the transducer is driven at a range of frequencies to supply ultrasound energy to the acoustofluidic device with the first liquid filling the cavity,
  iii. providing a second liquid filling the cavity, wherein the second liquid differs from the first liquid in its acoustophysical properties, such as in the speed of sound,
  iv. obtaining a second impedance spectrum, by measuring the electrical impedance of the ultrasound transducer as the ultrasound transducer is driven at the range of frequencies to supply ultrasound energy to the acoustofluidic device with the second liquid filling the cavity,
  v. predicting the one or more resonance frequencies for efficient operation of the microfluidic cavity by comparing the first and second impedance spectrum and selecting the one or more frequencies where the absolute value of the difference between the spectra, normalized by the absolute value of one of them, is largest.

Accordingly the present invention is based on the realization that a comparison between impedance spectra obtained for an acoustofluidic device before and after changing the acoustophysical properties of the cavity, i.e. by filling the cavity with the first and second liquids with different acoustophysical properties, contains information about the resonance frequency of the cavity and allows the prediction of one or more resonance frequencies for efficient operation of the cavity. Obtaining the impedance spectra does not require manual observation of the microfluidic channel, and the prediction of the one or more resonance frequencies also can be performed automatically. The method can therefore be automated and performed e.g. once for each chip or repeatedly during or before the performance of an acoustofluidic operation.

As evidenced by the examples, see Example 3, the method provides the prediction of one or more resonance frequencies for efficient operation of the acoustofluidic cavity. The method according to first aspect of the present invention may alternatively or additionally provide one or more resonance frequencies for efficient operation of the acoustofluidic cavity. The method further provides one or more possible resonance frequencies for efficient operation of the acoustofluidic cavity.

Generally the method predicts at least one resonance frequency. Dependent on the dimensions and materials of the acoustofluidic device, and the range of frequencies, the method may further predict additional resonance frequencies.

In the context of the present invention a resonance frequency for efficient operation of an acoustofluidic cavity encompasses a frequency which, when ultrasound energy is supplied to the acoustofluidic device at this frequency, a standing wave is caused within the cavity. The formation of a standing wave corresponds to a relatively high ratio of ultrasound (acoustic) energy in the cavity compared to what is achieved at other frequencies for which no standing wave is caused in the cavity. The resonance frequency for efficient operation of the acoustofluidic cavity is a frequency which causes focusing, i.e. congregation, of particles with a positive acoustic contrast relative to a suspending solution in the cavity, to one or more defined regions of the cavity.

The acoustofluidic cavity is preferably a microfluidic cavity such as a microfluidic channel. Such cavities and channels may be formed by etching or micromachining in a substrate. The channel may have a generally rectangular cross section with opposing straight or quarter circular walls and opposing ceiling and roof. The channel may comprise one or more inlets as well as one or more outlets.

The acoustofluidic device may for example be an acoustofluidic device for separation of cells or particles, a device for collecting, trapping or fractionating particles based on particle size and or acoustic contrast relative to a suspending liquid or solution.

Steps i and ii of the method may be combined in a single step. Steps iii and iv may also, or alternatively, be combined in a single step. Steps i and ii may be performed before or after steps iii and iv.

The first liquid and the second liquid, respectively, may be provided in the cavity by being infused into the cavity, for example by a syringe or pump. The first liquid and the second liquid, respectively, may be provided from a reservoir.

The first and second impedance spectrum may be obtained by an impedance analyzer electrically connected to the ultrasound transducer.

The ultrasound transducer may be connected to the acoustofluidic device by being attached, for example by glue, to the acoustofluidic device. Alternatively the ultrasound transducer is not comprised by the acoustofluidic device but positioned in contact with it. Preferably the ultrasound transducer is positioned beneath the microfluidic channel.

The ultrasound transducer is preferably a piezoelectric transducer. The ultrasound transducer may be driven, e.g. actuated, by a periodic signal having a frequency f and an amplitude defined by the voltage peak to peak (Vpp). In steps ii and iv the Vpp may be 1 Vpp.

The range of frequencies may for example comprise an array of a finite number of frequencies starting at a start frequency, increasing by a frequency step, and ending at an end frequency, or alternatively a continuous frequency sweep.

The acoustophysical properties comprise density, compressibility and/or speed of sound. By providing the first and second liquids in the cavity acoustophysical properties of the cavity is changed between the impedance measurements.

This way the difference between the two impedance spectra is due to the cavity and thus contains information about the resonance frequencies of the cavity. The first and second impedance spectrum may be compared by a computer. The comparison of the first and second impedance spectrum, and thus the difference between the spectra, may be obtained by subtracting one from the other. The absolute value of the difference between the spectra gives a positive value for the difference. By normalizing this absolute value to the absolute value on one of the spectra the largest values will correspond to the one or more resonance frequencies for efficient operation of acoustofluidic cavity.

In the preferred embodiment of the method according to the first aspect of the present invention, in the first impedance spectrum, the complex valued impedance $\hat{Z}_1$ for each frequency is given by $$\hat{Z}_1 = |\hat{Z}_1|\exp\left(\frac{i\varphi_1\pi}{180°}\right)$$

and, in the second impedance spectrum, the complex valued impedance $\hat{Z}_2$ for each frequency is given by $$\hat{Z}_2 = |\hat{Z}_2|\exp\left(\frac{i\varphi_2\pi}{180°}\right)$$

where $|\hat{Z}_1|$ and $|\hat{Z}_2|$ is the impedance magnitude and $\varphi_1$ and $\varphi_2$ is the phase angle for the respective spectra, and step v comprises determining the frequencies corresponding to the largest values in the normalized differential impedance spectrum, in which spectrum the normalized differential absolute impedance $|\hat{Z}|_{DS}$ for each frequency is given by:

$$|\hat{Z}|=|\hat{Z}_1-\hat{Z}_2|/|\hat{Z}_1|.$$

Thus the selection of the one or more frequencies where the absolute value of the difference between the spectra, normalized by the absolute value of one of them, is largest, corresponds to finding the frequencies of the highest peaks in the normalized differential impedance spectrum.

Preferably the second liquid differs from the first liquid with regards to density and/or compressibility.

In the preferred embodiment of the method according to the first aspect of the present invention the speed of sound in the second liquid is at least 0.1%, and preferably not more than 0.81%, lower than the speed of sound in the first liquid.

As seen in table 3 the speed of sound decreases as the density of the liquid increases. A reduction of the speed of sound by 0.1% corresponds to the density of a 2.5% aqueous CsCl solution compared to water, whereas a reduction of the speed of sound by 0.81% corresponds to the density of a 20% aqueous CsCl solution compared to water. However, as shown in FIG. 6A the frequency at which the peaks form in the normalized differential absolute impedance spectrum is not significantly affected by the difference in the speed of sound between the second and first liquid, and thus the method functions also with different differences in speed of sound, and therefore also differing differences in acoustophysical properties, between the first and second liquid.

In the preferred embodiment of the method according to the first aspect of the present invention the density of the second liquid is at least 2% and preferably no more than 21%, more preferably not more than 15.2%, higher or lower than the density of the first liquid.

A density of 2% higher or lower corresponds to the difference between a 2.5% aqueous solution of CsCl and water, whereas a density of 15.2% higher or lower corresponds to the difference between a 20% aqueous CsCl solution and water. Further, a difference of 21% corresponds to the difference between water an ethanol.

In embodiments of the method according to the first aspect of the present invention the first and second liquid may each be selected from the group consisting of: water; aqueous solutions of for example salts such as CsCl, polymers such as a polymer formed by copolymerization of sucrose and epichlorohydrin, nanoparticles; diluted or undiluted biological liquids such as blood, blood plasma, urine or cerebrospinal fluid; and alcohols such as ethanol.

Generally the difference in acoustophysical properties (e.g. speed of sound, density, compressibility) between the first and second liquid may be obtained by selecting different liquids for the first and second liquids, or by selecting a liquid, such as water, as the first liquid and obtaining the second liquid by modifying the properties, such as by increasing the density (by adding a density increasing component such as a salt or a polymer), of the first liquid.

It may additionally be advantageous if the first liquid is water or an aqueous cleaning solution for example comprising surfactants, and the second liquid is a sample liquid (such as a diluted or undiluted biological liquid as mentioned above) upon which an acoustofluidic operation is to be performed. In this way the resonance frequency for an acoustofluidic device in which an acoustofluidic operation is to be performed on such a sample liquid (second/first) liquid can be predicted using only one additional (first/second) liquid.

In the preferred embodiment of the method according to the first aspect of the present invention the first liquid is water and the second liquid is a solution of cesium chloride (CsCl) in water, the concentration of cesium chloride being at least 2.5 wt % and preferably no more than 20 wt % (i.e. by weight), the concentration of cesium chloride more preferably being 20%.

This is advantageous as water (or aqueous solutions) is the liquid in which most acoustofluidic operations are performed, and as CsCl has a high density. This is also the choice of liquids used in Example 3.

In certain embodiments of the method according to the first aspect of the present invention the ultrasound transducer has characteristic resonance frequencies and the range of frequencies spans from a frequency that is 80% of one of the characteristic resonance frequencies to a frequency that is 140% of this characteristic resonance frequency. The characteristic resonance frequencies are determined by the dimensions, material and temperature of the ultrasound transducer.

Typically the characteristic resonance frequency may be in the range of 1 to 10 MHz.

In alternative embodiments of the method according to the first aspect of the present invention an expected cavity resonance frequency $f_{exp}$ is determined by the relation $f_{exp}=cn/2d$ where c is the speed of sound in a liquid, preferably water, intended to subjected to an acoustofluidic operation in the acoustofluidic device, n is an integer, and d is a dimension such as width, height or length, of the acoustofluidic cavity, and the range of frequencies spans from a frequency that is 80% of the expected cavity resonance $f_{exp}$ to a frequency that is 140% of the expected cavity resonance $f_{exp}$. Although the range of frequencies may be wide, it is more efficient to obtain the impedance spectra for a range of frequencies which covers and brackets the expected resonance frequency. Preferably d is the largest dimension of the acoustofluidic cavity.

In the preferred embodiment of the method according to the first aspect of the present invention a frequency step of 10 kHz or less, such as 1 or 0.5 kHz is used in steps ii and iv for obtaining the first and second impedance spectra.

Using a smaller frequency step increases the resolution of the impedance spectra.

In some embodiments of the method according to the first aspect of the present invention each of the first and second impedance spectra are the mean of at least 8 consecutive impedance measurements. This may decrease noise that may be caused by the instrument, such as the impedance analyzer, used to measure the impedance.

In the preferred embodiment of the method according to the first aspect of the present invention the acoustofluidic device comprises a substrate, made of silicon or glass, in which the acoustofluidic cavity is provided and a glass lid bonded to the substrate for defining one side of the acoustofluidic cavity.

The cavity is preferably provided in the substrate by etching or micro machining. The glass lid is preferably bonded to the substrate anodically. The side of the cavity defined by the glass lid is preferably the roof. The ultrasound transducer is preferably attached to the bottom of the substrate, closest to the bottom of the cavity, but can also be attached to the side of the substrate.

At least one of the objects of the invention are further obtained by a method of operating an acoustofluidic device according to the second aspect of the present invention comprising performing the steps of the method according to the first aspect of the present invention, followed by performing the steps of:

vi. driving the ultrasound transducer of the acoustofluidic device with:
  a. at least one frequency within 90% to 110% of one or more of the predicted resonance frequencies, or
  b. a frequency sweep encompassing a frequency within 90% to 110% of one or more of the predicted resonance frequencies, and optionally performing the steps of:
vii. identifying a feature, such as a peak or dip, in an electrical impedance spectrum of the ultrasound transducer, the feature being present at the one or more predicted resonance frequencies, and
viii. repeatedly adjusting the at least one frequency or the frequency sweep based on following the position, in terms of frequency, of the feature, if the position changes.

As seen in Example 3 perfect focusing, i.e. efficient operation, is generally found within at least 90% to 110% of one or more of the predicted resonance frequencies.

The frequency sweep may for example extend from 90% to 110% of one or more of the predicted resonance frequencies.

With the optional steps vii and viii the method further compensates for variations that may arise as the acoustofluidic device is operated. This includes inter alia changes in system temperature, system aging, and acoustic properties of a liquid sample (including any suspended particles) upon which an acoustofluidic operation is performed. Generally the position of the peak or dip, i.e. the highest or lowest impedance value, is followed. If for example the temperature of the ultrasound transducer increases as it is driven this may case a shift of the feature. By following the movement of the position of the peak or dip and adjusting, i.e. increasing/decreasing frequency or frequency sweep with which the ultrasound transducer is driven, this variation can be compensated for and an efficient operation of the acoustofluidic cavity maintained.

In one example the acoustofluidic operation may be suspended regularly and the ultrasound transducer driven over a range of frequencies to obtain the impedance spectra, whereafter the frequency or the frequency sweep is adjusted before resuming the acoustofluidic operation.

At least one of the objects of the invention are further obtained by an apparatus for predicting one or more resonance frequencies for efficient operation of an acoustofluidic cavity in an acoustofluidic device according to the third aspect of the present invention, the apparatus comprising:
  a device configured to sequentially provide a first and a second liquid filling the acoustofluidic cavity, wherein the second liquid differs from the first liquid in its acoustophysical properties, such as in the speed of sound,
  a drive unit configured to drive an ultrasound transducer connected to the acoustofluidic device at a range of frequencies to supply ultrasound energy to the acoustofluidic device,
  an impedance sensing unit electrically connected to the drive unit and configured to obtain first and second impedance spectra, by measuring the impedance of the ultrasound transducer as it is driven over the range of frequencies, when the first, respective the second, liquid is provided filling the cavity,
  a computing device configured to predict one or more resonance frequencies for efficient operation of the acoustofluidic cavity by comparing the first and second impedance spectrum and selecting the frequencies where the absolute value of the difference between the spectra, normalized by the absolute value of one of them, is largest, and, preferably
  a recording device configured to record the one or more resonance frequencies determined by the computing device and associate it with the acoustofluidic device.

The ultrasound transducer may be comprised by the acoustofluidic device for which one or more resonance frequencies are to be predicted. In this case the apparatus may comprise a connector electrically connected to the drive unit and configured to connect to the ultrasound transducer of the acoustofluidic device. Alternatively the acoustofluidic device does not comprise the ultrasound transducer. In this case the apparatus comprises the ultrasound transducer and a holder for positioning the ultrasound transducer in contact with the acoustofluidic device.

The device may for example comprise a syringe or pump and reservoirs for the first liquid and the second liquid, as well as tubing and connectors to the acoustofluidic device and cavity.

The drive unit may comprise a function generator.

The impedance sensing unit may be an impedance analyzer.

The computing device may be a general purpose computer or microcomputer.

The recording device may record the one or more resonance frequencies physically, such as by comprising a printer, or non-physically such as in digital form on a storage media.

The methodical features of embodiments of the method according to the first aspect of the present invention as described above are applicable to embodiments of the apparatus according to the third aspect of the present invention.

In the preferred embodiment of the apparatus according to the third aspect of the present invention the recording device prints or engraves the resonance frequency on the acoustofluidic device.

The resonance frequency may be represented by a barcode, QR code, or alphanumerical string. This is advantageous as it associates the determined resonance frequency with the specific acoustofluidic device.

At least one of the objects of the invention are further obtained by an apparatus according to the fourth aspect of the invention, the apparatus comprising an acoustofluidic device with an acoustofluidic cavity, such as a channel, and being configured to perform an acoustofluidic operation, such as separation or trapping of cells or particles, in the acoustofluidic cavity, wherein the apparatus comprises
- a device configured to sequentially provide a first and a second liquid filling the acoustofluidic cavity in the acoustofluidic device, wherein the second liquid differs from the first liquid in its acoustophysical properties, such as in the speed of sound,
- an ultrasound transducer connected to the acoustofluidic device for performing the acoustofluidic operation,
- a drive unit electrically connected to the ultrasound transducer and configured to drive the ultrasound transducer at a range of frequencies to supply ultrasound energy to the acoustofluidic device,
- an impedance sensing unit electrically connected to the ultrasound transducer to obtain first and second impedance spectra, by measuring the impedance of the ultrasound transducer as it is driven over the range of frequencies, when the first, respective the second, liquid is provided filling the cavity,
- a computing device configured to predict one or more resonance frequencies for efficient operation of the acoustofluidic cavity by comparing the first and second impedance spectrum and selecting the frequency where the absolute value of the difference between the spectra, normalized by the absolute value of one of them, is largest, and
- wherein the apparatus is further configured to perform the acoustofluidic operation by driving the ultrasound transducer with
  a) at least one frequency within 90% to 110% of one or more of the predicted resonance frequencies, or
  b) a frequency sweep encompassing a frequency within 90% to 110% of one or more of the predicted resonance frequencies, The methodical features of embodiments of the method according to the first and second aspects of the present invention as described above, and the features of the apparatus according to the third aspect of the present invention as described above, are applicable to embodiments of the apparatus according to the fourth aspect of the present invention.

In some embodiments of the apparatus according to the fourth aspect of the present invention the impedance sensing unit and the control unit may be configured to identify a feature, such as a peak or dip, in an electrical impedance spectrum of the ultrasound transducer, the feature being present at the one or more predicted resonance frequencies, and the control unit may be configured to cause the drive unit to repeatedly adjust the at least one frequency or the frequency sweep based on following the position, in terms of frequency, of the feature, if the position changes.

Preferably the apparatus according to the fourth aspect of the present invention comprises the apparatus according to the third aspect of the present invention for providing the device configured to provide the first and second liquid, the drive unit, the impedance sensing unit, and the computing device.

At least one of the above mentioned objectives are, according to first alternative aspect of the present invention, achieved by a method of predicting one or more resonance frequencies for efficient operation of an acoustofluidic cavity, such as a channel, in an acoustofluidic device, the method comprising the steps of:
i. setting the temperature of the acoustofluidic device to a first temperature T1,
ii. providing a first liquid filling the cavity and allowing the liquid to reach the first temperature T1,
iii. obtaining a first liquid impedance spectrum, by measuring the electrical impedance of an ultrasound transducer connected to the acoustofluidic device as the transducer is driven at a range of frequencies to supply ultrasound energy to the acoustofluidic device with the first liquid at the first temperature T1 filling the cavity,
iv. providing a first gas filling the cavity and allowing the first gas to reach the first temperature T1,
v. obtaining a first gas impedance spectrum, by measuring the electrical impedance of an ultrasound transducer connected to the acoustofluidic device as the transducer is driven at a range of frequencies to supply ultrasound energy to the acoustofluidic device with the first gas at the first temperature T1 filling the cavity,
vi. setting the temperature of the acoustofluidic device to a second temperature T2, which second temperature T2 is different from the first temperature T1,
vii. providing a second liquid filling the cavity and allowing the second liquid to reach the second temperature T2,
viii. obtaining a second liquid impedance spectrum, by measuring the electrical impedance of an ultrasound transducer connected to the acoustofluidic device as the transducer is driven at a range of frequencies to supply ultrasound energy to the acoustofluidic device with the second liquid at the second temperature T2 filling the cavity,
ix. providing a second gas filling the cavity and allowing the second gas to reach the second temperature T2,
x. obtaining a second gas impedance spectrum, by measuring the electrical impedance of an ultrasound transducer connected to the acoustofluidic device as the transducer is driven at a range of frequencies to supply ultrasound energy to the acoustofluidic device with the second gas at the second temperature T2 filling the cavity,
xi. determining a first differential impedance spectrum from the first and the second liquid impedance spectra,
xii. determining a second differential impedance spectrum from the first and the second gas impedance spectra, and
xiii. predicting the one or more resonance frequencies for efficient operation of the acoustofluidic cavity by comparing the first and second differential impedance spectra and selecting the one or more frequencies where the differential impedance spectra differs the most.

As described in Example 1 it was initially noted that impedance spectra for an air filled channel deviated from impedance spectra from channels filled with liquids of varying acoustophysical properties, and that hence it could be that the impedance spectrum from an air-filled channel contained less or no information about the resonance in the flow channel.

Accordingly, as shown in Example 2 and 3, the method according to the first aspect of the present invention provides predictions of resonance frequencies based on the normalized absolute difference between first and second impedance spectra for two liquids differing in acoustophysical properties.

Temperature influences acoustophysical parameters. Example 4 details investigations into the influence of temperature of the acoustofluidic device (including any liquid in its channel) on the electrical impedance spectrum.

As further shown in Example 4 it was thus found that a first normalized differential spectrum of the acoustofluidic device with air in the channel at first and second temperatures gave information on the resonance frequencies of the bulk, i.e. of the acoustofluidic device itself. In contrast a second normalized differential spectrum of the acoustofluidic device with liquid, in this case water, in the channel at first and second temperatures gave information on the resonance frequencies of the acoustofluidic device (bulk) and the channel. By comparing the first and second normalized differential spectra the resonance frequencies of the channel alone could be determined, thus resulting in a prediction of one or more resonance frequencies for efficient operation of the acoustofluidic cavity, i.e. the channel.

Accordingly the first alternative aspect of the present invention provides an alternative solution to how to predict the one or more resonance frequencies from differential impedance spectra that is advantageous if two different liquids are not available or feasible to use. As further shown in Example 4 an absolute temperature difference T1 vs. T2 of 1° C. is enough.

The temperature difference between T1 and T2 must be large enough to create a shift of the resonance peaks in the impedance spectrum large enough to be detectable. The difference is therefore typically at least 0.5° C.

T1 and T2 should respectively preferably be the same for the gas and liquid measurements. In other words T1 in steps iii and v should be the same, whereas T2 in steps viii and x should be the same. It is however contemplated that, due to experimental conditions, T1 in step iii (T1L) could differ slightly from T1 in step v (T1G). Likewise it is contemplated that T2 in step viii (T2L) could differ slightly from T2 in step x (T2G). In such cases the difference should so small that it does not result in a detectable shift of the resonance peaks in the impedance spectrum which is large in comparison to the width of the peak. The difference, if any, should therefore be less than 3° C., preferably less than 1° C., more preferably less than 0.1° C.

The difference should in any case be less than the difference between T1 and T2.

The steps may be performed in any order provided that the first and second differential impedance spectra have been determined before the one or more resonance frequencies are predicted.

Preferably the first differential impedance spectrum is a first normalized differential absolute impedance spectrum, and the second differential impedance spectrum is a second normalized differential absolute impedance spectrum.

The speed of sound in the first liquid preferably differs by less than 1%, preferably less than 0.1%, from the speed of sound in the second liquid, and/or the density of the first liquid preferably differs by less than 10%, preferably less than 2%, from the density of the second liquid.

Preferably the second liquid is the same as the first liquid and/or has the same acoustophysical properties. Preferably the second gas is the same as the first gas.

The first and second liquids may be any liquid used in the method according to the first aspect of the present invention.

Preferably the first and second liquids are water or an aqueous solution.

Preferably the first and second gases are air, nitrogen or carbon dioxide.

The difference between the first temperature T1 and the second temperature T2 is preferably at least 0.5° C., preferably at least 1° C., such as at least 3° C.

Preferably the difference between the first temperature T1 and the second temperature T2 is at most 100° C., such as at most 20° C., preferably at most 12° C., such as at most 5° C., at most 3° C., or at most 1° C.

Preferably the first temperature T1 and the second temperature T2 are from 0-99° C., preferably from 1-90° C., more preferably from 10-80° C., such as from 18-30° C., preferably from 20-40° C.

The difference between the first and second normalized differential absolute impedance spectra may obtained by subtracting the second normalized differential absolute impedance spectrum from the first normalized differential absolute impedance spectrum, or vice versa.

The respective first and second liquid and gas impedance spectra, and the first and second normalized differential absolute impedance spectra may be defined and determined analogously to as discussed above for the method according to the first aspect of the present invention.

The range of frequencies, and/or the frequency step, may be as discussed above for the method according to the first aspect of the present invention.

The acoustofluidic device may be as discussed above for the method according to the first aspect of the present invention.

An alternative second aspect of the present invention comprises the method according to the second aspect of the present invention wherein the method according to the first alternative aspect is used to obtain the one or more predicted resonance frequencies.

A third alternative aspect of the present invention comprises the apparatus according to the third aspect of the present invention in which:
the device configured to sequentially provide a first and a second liquid is modified to instead selectively provide a first liquid, a second liquid, a first gas, and a second gas filling the acoustofluidic cavity,
the apparatus further comprises:
a temperature control device configured to control the temperature of the acoustofluidic device to the first, and the second temperatures T1 and T2, respectively, and wherein:
the impedance sensing unit is configured to obtain first and second liquid and gas impedance spectra, and
the computing device is configured to determine first and second differential impedance spectra, and further configured to predict the one or more resonance frequencies for efficient operation of the acoustofluidic cavity by comparing the first and second differential impedance spectra and selecting the one or more frequencies where the differential impedance spectra differs the most.

As above the differential impedance spectra are preferably normalized differential absolute impedance spectra.

As with the apparatus according to the third aspect of the invention the apparatus according to the third alternative aspect may comprise a recording device as described above.

An apparatus according to a fourth alternative aspect of the present invention may be as described above for the apparatus according to the fourth aspect, however comprising an apparatus according to the third alternative aspect instead of an apparatus according to the third aspect.

BRIEF DESCRIPTION OF THE FIGURES

A more complete understanding of the abovementioned and other features and advantages of the present invention will be apparent from the following detailed description in conjunction with the appended drawings, wherein.

DETAILED DESCRIPTION OF THE INVENTION

Figure 1A:
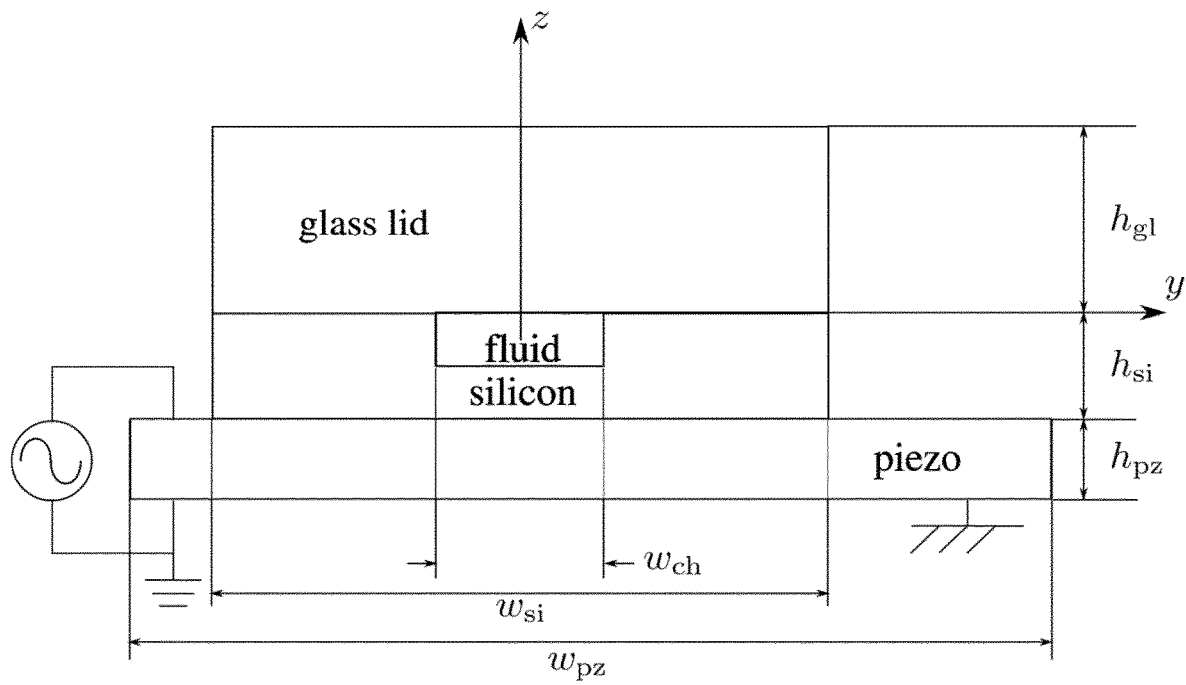
FIG. 1 shows general dimensions of test acoustofluidic devices of the Silicon-glass type, the silicon-glass type with air-channels, and the glass-glass type.

Below examples detail the observations made leading to the method according to the first aspect of the present invention.

Example 1—Initial Study of Impedance Measurements and Focusability Experiments on Test Acoustofluidic Devices 1.1 Characteristics of Test Acoustofluidic Devices In this and the following examples 2 and 3 a number of different test acoustofluidic devices are used. The characteristics of these devices are summarized in table 1 below.

TABLE 1

Characteristic of different test acoustofluidic devices

| Device | Silicon length $L_{si}$ (μm) * | Silicon width $w_{si}$ (μm) * | Silicon height $h_{si}$ (μm) * | Channel width $w_{ch}$ (μm) | Channel height $h_{ch}$ (μm) | Glass (lid) dimension $w_{gl} \times h_{gl}$ (μm) |
|---|---|---|---|---|---|---|
| A1 | 40753 | 2995 ± 1 | 350 | 302 | 150 | 3000 × 1100 |
| A2 | 40601 | 3010 ± 15 | 350 | 301 | 150 | 3000 × 1100 |
| A3 | 40838 | 3016 ± 23 | 350 | 302 ± 1 | 150 | 3000 × 1100 |
| B1 | 40115 | 3009 ± 11 | 380 ± 25 | 368 ± 1 | 138 ± 1 | 3139 ± 102 × 1095 ± 5 |
| B2 | 39867 | 2940 ± 10 | 380 ± 25 | 370 ± 4 | 134 ± 2 | 3139 ± 102 × 1095 ± 5 |
| B3 | 40093 | 2987 ± 7 | 380 ± 25 | 370 ± 3 | 138 ± 2 | 3139 ± 102 × 1095 ± 5 |
| B4 | 40080 | 3007 ± 11 | 380 ± 25 | 367 ± 6 | 139 ± 2 | 3139 ± 102 × 1095 ± 5 |
| B5 | 38062 | 2907 ± 50 | 380 ± 25 | 368 ± 4 | 138 ± 1 | 3139 ± 102 × 1095 ± 5 |
| B6 | 40910 | 3003 ± 15 | 380 ± 25 | 365 ± 5 | 106 | 3139 ± 102 × 1095 ± 5 |
| C1 | 40102 | 3014 ± 14 | 380 ± 25 | 378 ± 1 | 141 ± 1 | 3139 ± 102 × 1095 ± 5 |

TABLE 1-continued

Characteristic of different test acoustofluidic devices

| Device | Silicon length $L_{si}$ (µm) * | Silicon width $w_{si}$ (µm) * | Silicon height $h_{si}$ (µm) * | Channel width $w_{ch}$ (µm) | Channel height $h_{ch}$ (µm) | Glass (lid) dimension $w_{gl} \times h_{gl}$ (µm) |
|---|---|---|---|---|---|---|
| C2 | 39921 | 2991 ± 7 | 380 ± 25 | 372 ± 2 | 146 ± 2 | 3139 ± 102 × 1095 ± 5 |
| D | 40693 | 2992 ± 2 | 350 | 302 ± 1 | 150 | 3000 × 200 |
| E1 | 40067 | 2986 ± 38 | 380 ± 25 | 368 ± 4 | 127 | 3139 ± 102 × 1095 ± 5 |
| E2 | 38088 | 2980 | 380 ± 25 | 364 ± 4 | 139 ± 1 | 3139 ± 102 × 1095 ± 5 |
| F | 62582 | nm | nm | 284 ± 5/ 359 ± 5 | nm | nm × 1100 |
| G | 60600 | 4784 ± 98 | nm | 318 ± 2/ 379 ± 1 | nm | nm × 1100 |
| H1 | 36107 | 2904 ± 44 | 380 ± 25 | 391 ± 1 | 165 ± 3 | 3139 ± 102 × 1095 ± 5 |
| H2 | 56220 | 2997 ± 5 | 380 ± 25 | 392 ± 1 | 153 ± 2 | 3100 ± 98 × 1098 ± 4 |
| I | 39742 | 5233 ± 54 | nm | 372 | nm | nm × 1100 |
| J | 39666 | 4932 | nm | 374 ± 4 | nm | 9960 ± 2 × 1100 |
| K | nm | 8799 ± 24 | nm | 188 ± 3 | nm | nm × 1100 |
| L1 | 44555 | 3010 ± 1 | nm | 435 ± 2 | nm | nm × 1100 |
| L2 | 44600 | 3015 ± 15 | nm | 373 ± 3 | nm | nm × 700 |
| L3 | 44560 | 3000 ± 2 | nm | 430 ± 2 | nm | nm × 1100 | nm = this measurement could not be measured for this device
na = this measurement is not applicable to this device
* for glass-glass devices these measurements refer to the main glass substrate in which the channel is formed.
Silicon thickness values of 380 ± 25 were provided by the supplier of the Silicon wafers.

Devices A1-A3 are commercially available silicon-glass devices. See FIG. 1A for general construction. For devices A1-A3 the dimensions of the piezoelectric transducer (also called "piezo" herein) were $L_{pz}$=24.94±0.03 mm, $w_{pz}$=4.98±0.04 mm and $h_{pz}$=1.010±

Devices B1-B6 are silicon-glass devices manufactured by the present inventors as described in section 1.2 below. See FIG. 1A for general construction. These devices were made from silicon wafers with the <100> orientation, see section 1.2. The length of the glass lid, $L_{gl}$ was 40.00±0.53 mm. The dimensions of the piezoelectric transducer were $L_{pz}$=24.90±0.10 mm, $w_{pz}$=5.07±0.06 mm and $h_{pz}$=1.024±0.005 mm.

Devices C1-C2 are silicon-glass devices manufactured by the present inventors as described in section 1.2 below using <110> wafers. See FIG. 1A for general construction. The length of the glass lid, $L_{gl}$ was 40.00±0.53 mm. The dimensions of the piezoelectric transducer were $L_{pz}$=24.90±0.10 mm, $w_{pz}$=5.07±0.06 mm and $h_{pz}$=1.024±0.005 mm.

Device D is a commercially available silicon-glass device. See FIG. 1A for general construction. For device D the dimensions of the piezoelectric transducer were $L_{pz}$=24.94±0.03 mm, $w_{pz}$=4.98±0.04 mm and $h_{pz}$=1.010±0.017 mm.

Devices E1-E2 were manufactured by the present inventors as described in section 1.2 below. These devices are silicon-glass devices with air-pockets and were made from silicon wafers with the <100> orientation, see section 1.2. See FIG. 1B for general construction. A straight flow channel proceeds from an inlet to an outlet. Air-pockets are provided (by etching) next to the flow channel. FIG. 1B show the general dimensions of these devices. The length of the glass lid $L_{gl}$=40.00±0.53 mm.

For E1 the air-pockets had a width, $w_{ap}$=1088±10 µm, a height, $h_{ap}$=128±1 µm and wall thickness of 23±4 µm, see section 1.2.

For E2 the air-pockets had a width, $w_{ap}$=1090±3 µm, a height, $h_{ap}$=139±1 µm and wall thickness of 23±2 µm.

The dimensions of the piezoelectric transducer were $L_{pz}$=24.90±0.103 mm, $w_{pz}$=5.07±0.10 mm and $h_{pz}$=1.010±0.005 mm.

Figure 1B:
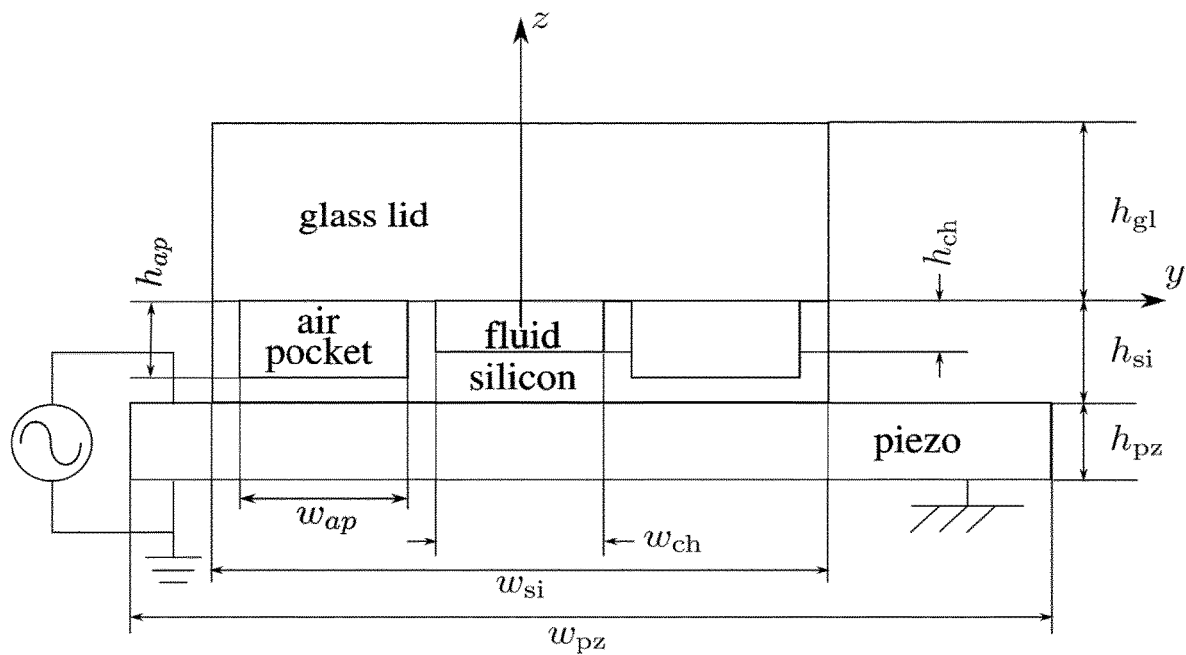

Device F is a silicon-glass device previously used for separating circulating tumor cells, see FIG. 1A for general construction. A first channel ($w_{ch}$=284±5 µm) runs from a first inlet along a pre-alignment section under which a first piezoelectric transducer (5 MHz) is mounted. The first channel then bifurcates and both branches then join a second channel ($w_{ch}$=359±5 µm) running from a second inlet along a separation section under which a second piezoelectric transducer (2 MHz) is mounted. The second channel is then trifurcated whereby the center branch proceeds to a first outlet and the two side branches proceed to a common second outlet. The dimensions of the first piezoelectric transducer (5 MHz) was $L_{pz}$=12.88±0.01 mm, $w_{pz}$=4.80±0.13 mm and $h_{pz}$=0.436±0.008 mm.

The dimensions of the second piezoelectric transducer (2 MHz) was $L_{pz}$=24.94±0.03 mm, $w_{pz}$=4.98±0.04 mm and $h_{pz}$=1.010±0.017 mm.

Device G is a silicon-glass device previously used for separating particles/cells, see FIG. 1A for general construction. A single channel runs from a first inlet to a second trifurcation in which the center branch proceeds to a first outlet and the two side branches proceed to a common second outlet. The width of the channel increases midpoint between the inlet and first outlet from 318±2 µm to 379±1 µm. The dimensions of the piezoelectric transducer glued to the bottom of the device was $L_{pz}$=24.94±0.03 mm, $w_{pz}$=4.98±0.04 mm and $h_{pz}$=1.010±0.017 mm.

Devices H1 and H2 are silicon-glass devices previously used for separating particles/cells and medium exchange, see FIG. 1A for general construction. A single channel runs from a first trifurcation, in which the center branch is connected to a first inlet and the two side branches are connected to a common second inlet, to a second trifurcation in which the center branch proceeds to a first outlet and the two side branches proceed to a common second outlet. Length of the glass lid for H1 and H2 were $L_{gl}$=40.00±0.53 mm (H1) and $L_{gl}$=56.50 mm (H2). The dimensions of the piezoelectric transducer glued to the bottom of the device was $L_{pz}$=15.62 mm (H1)/24.90±0.10 mm (H2), $w_{pz}$=5.07±0.06 mm and $h_{pz}$=1.024±0.005 mm Device I is a silicon-glass device previously used for separating particles/cells, see FIG. 1A for general construction. A single channel runs from a first trifurcation, in which the center branch is connected to a first inlet and the two side branches are connected to a common second inlet, to a second trifurcation in which the center branch proceeds to a first outlet and the two side branches proceed to a common second outlet. The dimensions of the piezoelectric transducer glued to the bottom of the device was $L_{pz}$=20.12 mm, $w_{pz}$=13 mm and $h_{pz}$=1 mm Device J is a silicon-glass device previously used for separating particles/cells, see FIG. 1A for general construction. A single channel runs from a first trifurcation, in which the center branch is connected to a first inlet and the two side branches are connected to a common second inlet, to a second trifurcation in which the center branch proceeds to a first outlet and the two side branches proceed to a common second outlet. The dimensions of the piezoelectric transducer glued to the bottom of the device was $L_{pz}$=24.94±0.03 mm, $w_{pz}$=4.98±0.04 mm and $h_{pz}$=1.010±0.017 mm.

Device K is a silicon-glass device previously used for separating particles/cells, see FIG. 1A for general construction. A single channel runs from an inlet to a trifurcation in which the center branch proceeds to a first outlet and the two side branches proceed to a common second outlet. The dimensions of the piezoelectric transducer glued to the bottom of the device was $L_{pz}$=16 mm, $w_{pz}$=16 mm, and $h_{pz}$=0.510±0.001 mm.

Figure 1C:
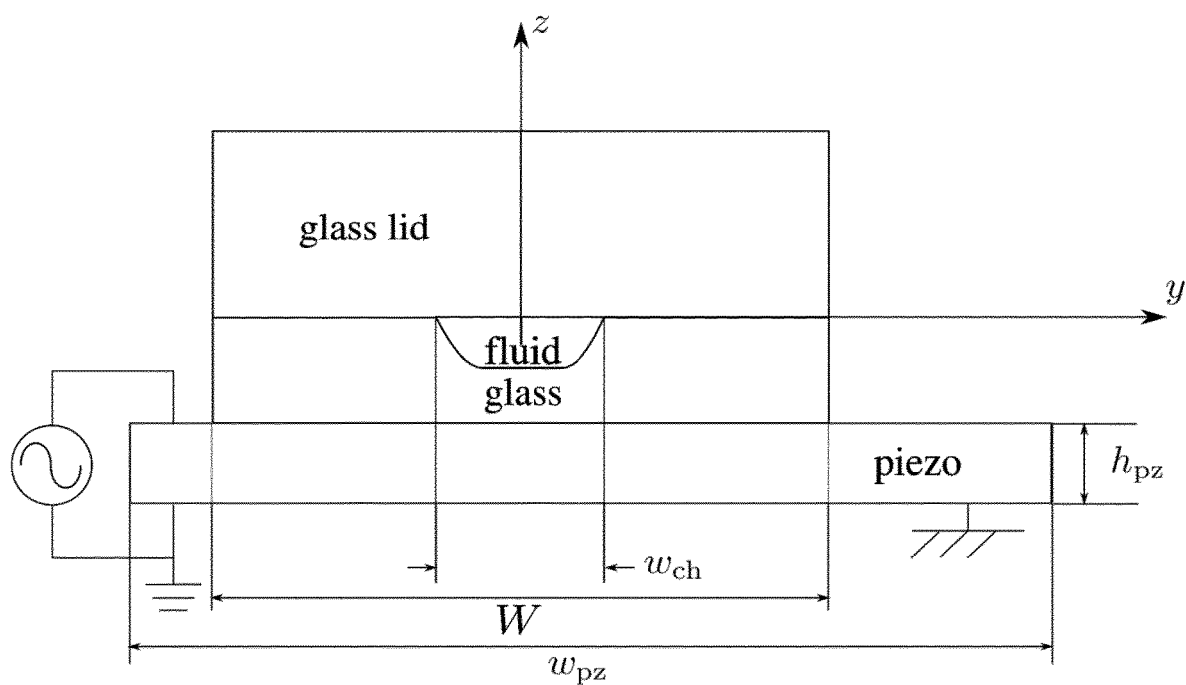

Devices L1-L3 are glass-glass devices with a straight flow channel, see FIG. 1C for general construction. The dimensions of the piezoelectric transducers glued to the bottom of the devices were $L_{pz}$=25.02±0.02 mm, $w_{pz}$=5.05±0.05 mm and $h_{pz}$=1.024±0.013 mm.

Measurements of the characteristics were performed using a measurement system (HEIDENHAIN-METRO Baureihe MT 12 Baureihe MT 25 Inkrementale Messtaster, Dr. Johannes Heidenhain GmbH, Germany) connected to a microscope (Olympus BX40 purchased from LRI instruments AB, Lund, Sweden). Firstly, the length of the silicon chip/device was measured; secondly, the measurements of the channel width and depth, air pockets width and depth, and walls thicknesses were taken in three different positions: ¼, ½ and ¾ of the total length of the chip.

The length of the glass and the transducers was measured using an electronic caliber, the width and the thickness of the elements were measured with a micrometer whose accuracy is ±0.007 mm (HELIO-Rapid 0|3"/150 mm Micrometer, Fred V. Fowler Company, Germany) in three locations: the extremes and the center.

1.2 Fabrication of Test Acoustofluidic Devices B, C and E

Devices of the types B (B1-B6), C (C1-C2) and E (E1-E2) were manufactured as follows using standard etching of silicon substrates to form channels and inlets/outlets, followed by bonding of a glass lid to the silicon.

A 6×6 inch square photomask was purchased from Nanofilm Inc (Westlake Village, CA) the mask consisting of three layers: a glass plate covered with a chromium layer that, in turn, was covered with a photoresist layer. Two different photomasks were realized: one defining the dimensions of the microchannels (top mask) and one defining both the inlet/outlet holes and the outline of each single chip (bottom mask). The mask was designed for defining channel dimensions of 375 μm width and 150 μm depth in the silicon corresponding to a theoretical resonance frequency of 2 MHz horizontally and 5 MHz vertically. For devices with air-pockets (type E) the mask was designed for defining air pockets 1.1 mm in width and 150 μm in depth and with an wall thickness (between the flow channel and the air-pockets of 20 μm and the distance between the lateral external edge of the silicon chip and the lateral external edge of the air pockets was set to 192.5 μm. The mask was further designed to provide a total length of the chip/device of 40 mm, the length of the flow channel being 35.1 mm and the length of the air pockets being 31.1 mm.

The photomask was written using a laser mask writer (Heidelberg Instruments DWL66 with a 405 nm single-mode diode laser. Once the pattern writing was completed, the resist development and the chrome etching were carried out.

Two 3-inch silicon wafers, 380 μm thick and with two different orientations, were used. One silicon wafer designated <100> was manufactured by Microchemicals, Germany, and the other silicon wafer designated <110> was manufactured by SunEdison Semiconductor, MO, USA). The pattern used on the <100> wafer was rotated 450 relative to the pattern used on the <110> wafer, A double-sided etching was carried out. A photoresist was applied on the wafer (after oxygen plasma cleaning in a Femto plasma cleaner (Diener electronic GmbH, Germany) using the spin coating technique in a Brewer Science CEE® 1000B Coat Bake System. The photoresist used was positive and of the type AZ® 1514 (Microchemicals GmbH, Germany).

The wafer and bottom mask were brought into direct contact (vacuum contact) and aligned using a mask aligner (Double sided mask aligner MJB21, Karl Suss, Germany) and exposure to UV-light took place in the mask aligner. The UV-light, which was uniformly distributed over the wafer, was shone through the photomask for 8.7 s.

The positive photoresist was then developed in a developer solution (AZ 351B purchased from Microchemicals GmbH, Germany) for 60 s. After a hard bake at 110° for one minute $SiO_2$ etching was carried out using buffered HF (Buffered Oxide Etch, BOE 7:1, Microchemicals GmbH, Germany) for ~35 minutes.

Silicon etching was performed in 28 wt % KOH, a solution of 200 g KOH in 500 ml of water, at 80° C., inside a beaker. The silicon etching was carried out in a USC ultrasonic cleaning unit (VWR International AB, Sweden)

Once the silicon etching on the bottom side had been performed, all the steps previously shown were repeated using the top mask.

Anodic bonding of silicon to glass was performed after the wafers had been cut into single chips. Before the bonding took place, $SiO_2$ etching was performed on the silicon chips for few seconds. The bonding was realized in a clean room by placing the chips on a heater block held at 450° C. The glass had been carefully cleaned using ethanol and then aligned on the silicon chip; a voltage of 1000 V was applied to the glass. The glass used was a 1.1 mm thick Pyrex glass (obtained from Glasteknik i Emmaboda AB, Sweden) and it was cut such that its dimensions were 40 mm in length and 3 mm in width.

Gluing of the silicon-glass chip to the piezoelectric transducer was carried out manually. The piezoelectric transducer used was a hard PZT (polyctrystalline lead zirconium titanate).

Two tin solid core wires were soldered to the piezoelectric transducer in order to allow the successive actuation of the transducer. The device was then placed in a holder in which the device hung free to vibrate. Tube access connections to the chip/device were created in the holder and realized using an o-ring (outer diameter 2.8 mm and inner diameter 1.3 mm) and screw connectors. Supelco Analytical Teflon tubing was used with 0.3 mm inner diameter.

1.3 Methods for Impedance Measurements and Focusability Experiments on the Test Acoustofluidic Devices Impedance measurements were performed in order to collect data of the electrical behavior of the devices. Focusability experiments were carried out to annotate frequencies where particle band formation was found by visual inspection.

The impedance measurements were carried out using an impedance analyzer (HP 4194A Impedance/Gain—Phase Analyzer, Hewlett-Packard, Palo Alto, CA, USA) connected to a computer and controlled using MATLAB® 2014. The output impedance spectrum was the mean of 8 consecutive measurements to reduce noise. A frequency step of 0.5 kHz was used. The frequency interval to investigate was chosen depending on the characteristics of the piezoelectric transducer (piezo) of the device being investigated, see table 2:

TABLE 2

Frequency intervals for impedance measurements

| Piezo resonance frequency (MHz) | Frequency interval MHZ |
|---|---|
| 2 | 1.5-2.8 |
| 4 | 3.5-5.8 |
| 5 | 4.5-6.8 |

It was investigated if and how the impedance and phase spectra change depending on the fluid that was led through the microchannel/flow channel. In this analysis all the available devices A-L were tested.

Two aqueous solutions of 10% and 20% Cesium Chloride (CsCl) were prepared. The density and speed of sound of the two solutions were measured using a density meter. Then, the impedance measurements were carried out in four different conditions:
1. Air-filled channel;
2. Water-filled channel;
3. 10% CsCl-filled channel;
4. 20% CsCl-filled channel;

Each fluid (1-4) was sequentially introduced into the flow channel using a syringe (1) or pump (2-4), and impedance measurements were carried out for each fluid.

Density and speed of sound of air, water, and the 10% CsCl and 20% CsCl solutions are given in table 3 below:

TABLE 3

Densities and speed of sound at 25° C.

| | Density ρ (kg/m$^3$) | Speed of sound c (m/s) |
|---|---|---|
| Air | 1.184 | 346 |
| Water | 998.480 | 1498.96 |

TABLE 3-continued

Densities and speed of sound at 25° C.

| | Density ρ (kg/m$^3$) | Speed of sound c (m/s) |
|---|---|---|
| 10% CsCl | 1074.741 | 1491.28 |
| 20% CsCl | 1149.686 | 1486.78 |

Focusability experiments were carried out in the Acoustofluidics laboratory at the Department of Biomedical Engineering at Lund University for the same fluids (1-4). The device (A-L) was placed under the microscope and tubings were connected to the inlet(s) and outlet(s). The piezoelectric transducer was driven, i.e. actuated, by applying a harmonically oscillating voltage drop generated by a function generator (33210A, Keysight technologies, CA, USA). The applied voltage was monitored using an oscilloscope (TDS 1002, Tektronix UK Ltd., UK). The flow channel was observed through a microscope (Leica DM2500 M, Leica Microsystems IR GmbH, Germany obtained from Micromedic AB LMS all segments, Stockholm, Sweden) with an attached camera (Zyla 5.5 MP sCMOS, ANDOR, Northern Ireland).

A solution with particles in suspension was led through the microchannel using a 1 ml syringe and a syringe pump (SP210IWZ Syringe Pump, World Precision Instruments, Inc., Germany). The sample fluid was a solution of water and 4.8 μm polystyrene particles (Fluoro-Max Dyed Green Aqueous Fluorescent Particles produced by Thermo Scientic) with a concentration of 7% and the pump rate was set to 10 μm/min.

The peak-to-peak voltage for the function generator was set to four different amplitudes: 2 V, 4 V, 6 V and 8 V. For each voltage amplitude, a frequency sweep was performed manually in the same range of the collected impedance measurements in table 2. Frequencies where particles were focused to the center of the channel were recorded.

Focusing could be either:
a) Perfect focusing: particles aligned perfectly one by one in the center of the channel,
b) Focused: particles focused in a region close to the center, but not perfectly aligned,
c) Not focused: particles distributed in the whole cross-section of the microchannel.

In initial studies devices of type A-C were used.

Impedance and phase spectra were collected in the different conditions (1-4). Then, these measurements were used to perform a differential impedance spectral analysis. Complex-valued impedances were computed from the impedance magnitude $|\hat{Z}|$ and the phase angle $\varphi_1$ data:

$$\hat{Z} = |\hat{Z}| \exp\left(\frac{i\varphi\pi}{180°}\right)$$

In this way four complex valued impedances were obtained:
1. $\hat{Z}_a$: complex impedance of air-filled flow channel
2. $\hat{Z}_w$: complex impedance of water-filled flow channel
3. $\hat{Z}_{10\%CsCl}$: complex impedance of flow channel filled with 10% CsCl-solution
4. $\hat{Z}_{20\%CsCl}$: complex impedance of flow channel filled with 20% CsCl-solution $\hat{Z}_w$ was set as reference as aqueous solutions are generally used in acoustofluidic operations. The absolute values of the difference between $\hat{Z}_w$ and $\hat{Z}_a$, $\hat{Z}_{10\%CsCl}$ and $\hat{Z}_{20\%CsCl}$, respectively, was computed:

$$|\hat{Z}|_{DS}=|\hat{Z}_W-\hat{Z}_i|$$

where i=a, 10% CsCl, 20% CsCl.

The result is a differential spectrum that has peaks at particular frequencies.

A normalized differential spectrum $|\hat{Z}|_{NDS}$ was further calculated:

$$|\hat{Z}|_{NDS}=|\hat{Z}_W-\hat{Z}_i|/|\hat{Z}_w|$$

where i=a, 10% CsCl, 20% CsCl.

Finally, any correspondence between the peaks in the differential spectrum $|\hat{Z}|_{DS}$, the normalized differential spectrum $|\hat{Z}|_{NDS}$ and the focusability results were investigated by inserting bands in the spectra, the bands covering the frequency where focusing was found. The focusability results were shown for each peak-to-peak voltage amplitude (2 Vpp, 4 Vpp, 6 Vpp and 8 Vpp). Perfect focusability (a) was shown with black filled bands, focusability (b) with white bands bordered with black lines, and no focusability (c) with no bands.

1.4 Initial Measurements and Results

Figure 2A:
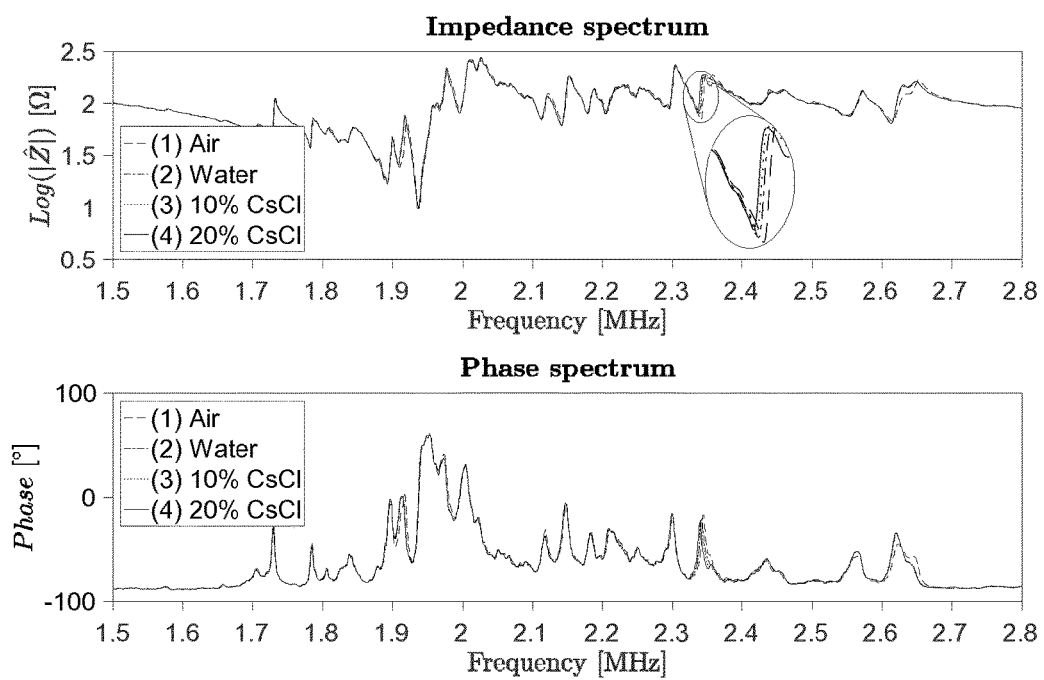
FIG. 2 shows impedance and phase spectra of test acoustofluidic devices A1, B1, C1, H and L1.
Figure 2B:
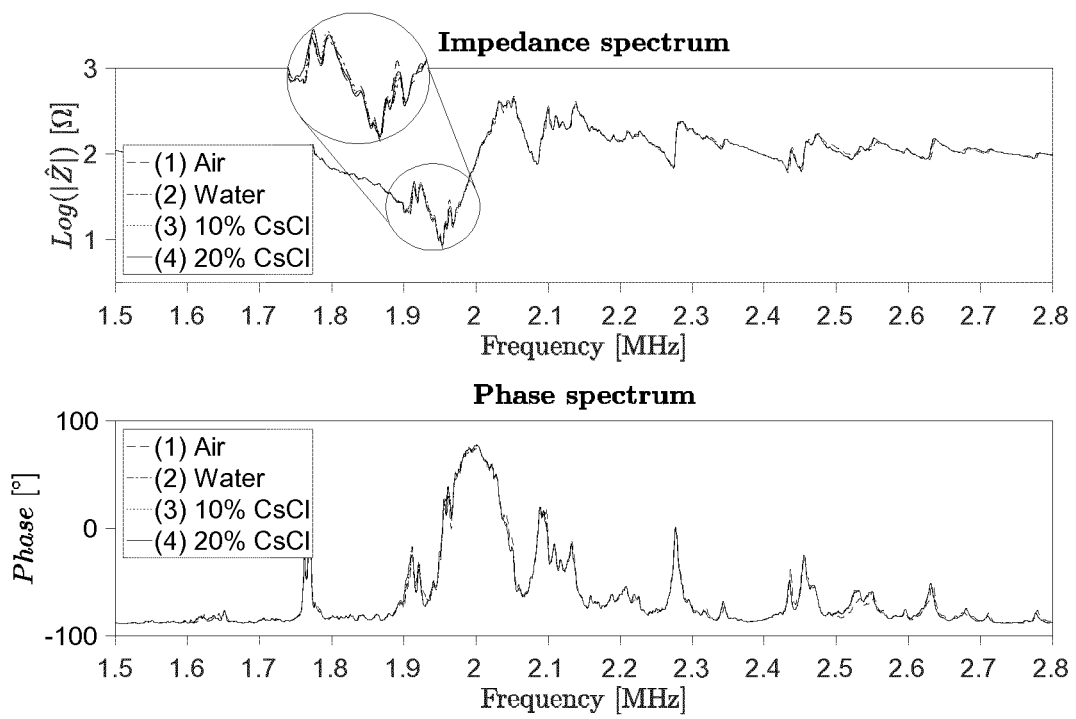
Figure 2C:
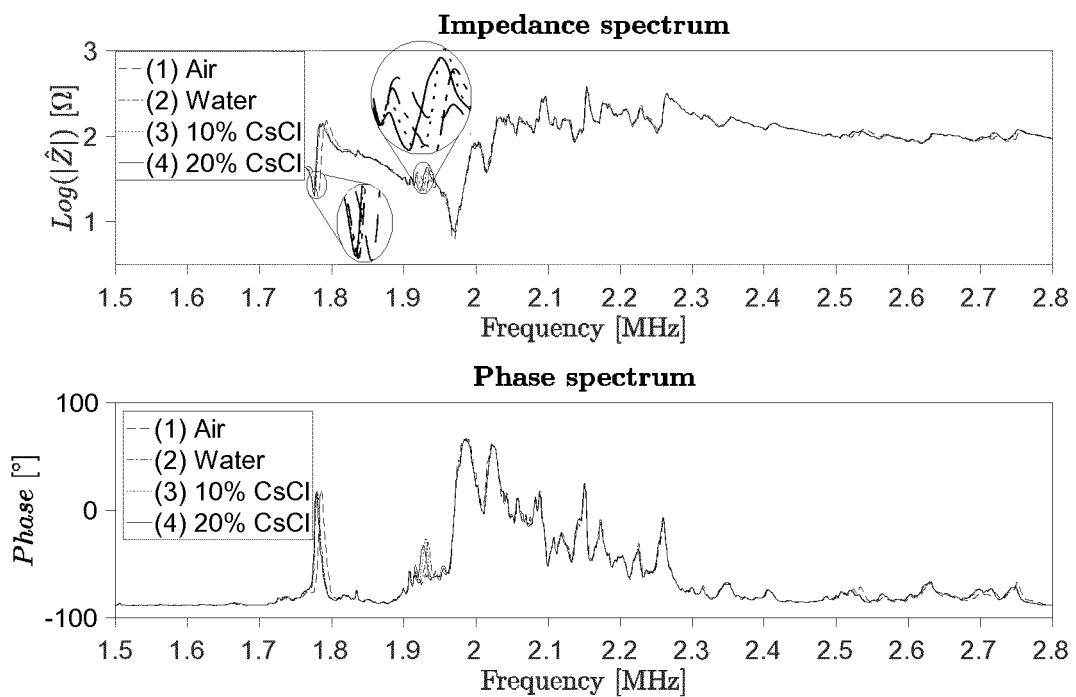
Figure 2D:
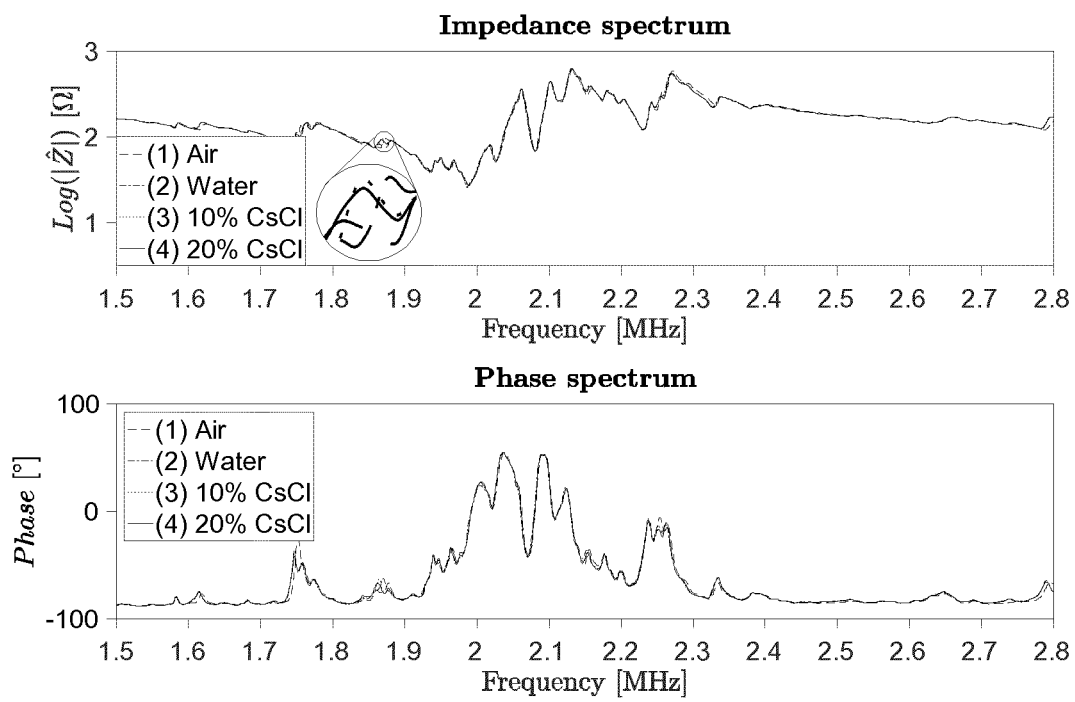
Figure 2E:
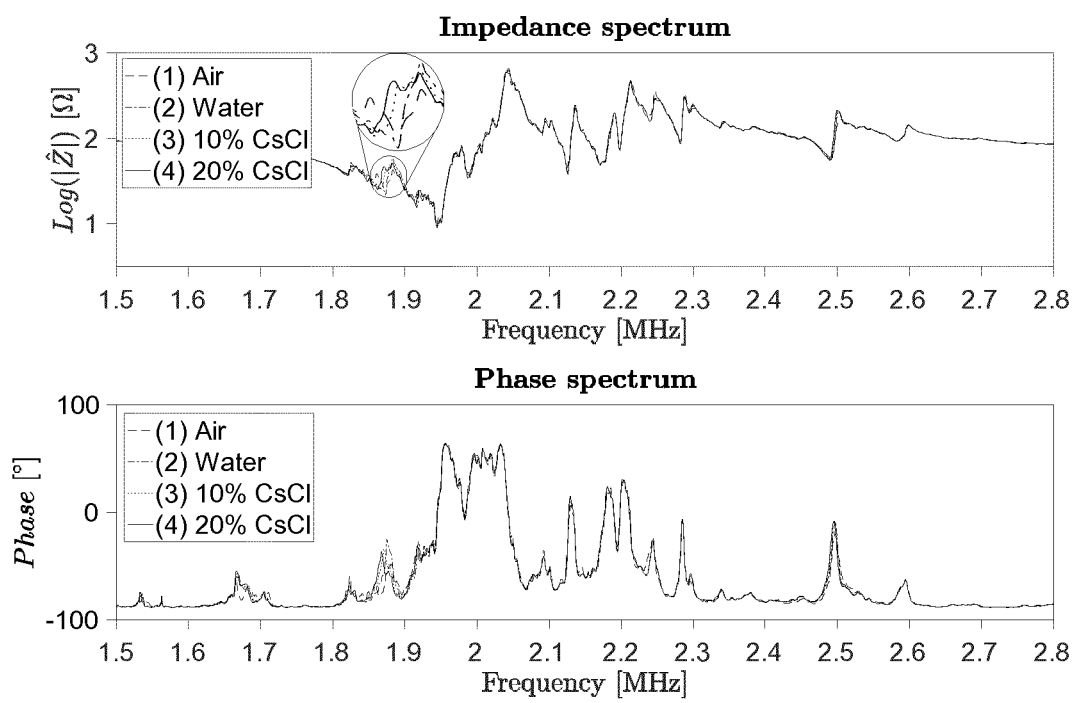

Successively, impedance measurements of all the available devices were performed in conditions (1)-(4). This was done in order to investigate whether impedance spectra, obtained in the different conditions (1)-(4) could contain information which could be related to the acoustic response (e.g. focusability) for the flow channel. The voltage used during the impedance measurements where 1 Vpp. The impedance magnitude $|\hat{Z}|$ and the phase angle $\varphi$ were investigated for each device for all conditions (1)-(4). Representative results are shown in FIG. 2 where FIGS. 2A-C show the results for the devices A1, B1, C1, FIG. 2D shows the results for the device H1, and FIG. 2E shows the results for the device L1.

The present inventors here noticed that all plots show that the impedance and phase spectra acquired in conditions (1)-(4) overlap quite well in correspondence of most of the frequencies, while deviations can be observed (zoomed in regions in the plots) in some regions. Thus it appeared that the different conditions (1)-(4) in which different fluids with different density and compressibility, and therefore different speed of sound, where present in the channel resulted in measurable differences in the impedance measurement results.

In particular it was found that the impedance spectra of all the tested devices exhibited deviations regardless the materials that the devices are composed of, who fabricated the devices and the complexity of the design.

It was further seen that two different types of deviation could be seen: an ordered shift of the spectra and a chaotic deviation of the spectra. In ordered shifts the deviation contained a (horizontal) frequency shift, in which the spectrum of the air-filled channel is always in the rightmost position followed by water, 10% CsCl and 20% CsCl, and a vertical shift in which the spectrum of the air-filled channel reaches has the lowest position (valley) followed by water, 10% CsCl, and 20% CsCl. The progression from air to water, 10% CsCl and finally 20% CsCl correlate with the increasing densities. As already mentioned above, the density and the compressibility of the fluids affect the sound propagation and they are in particular associated with the speed of sound. From this the inventors observed that the piezoelectric transducer is sensitive to the weight of the different fluids only at particular frequencies.

As the only difference between the conditions (1)-(4) is the fluid within the flow channel, it was now realized that this difference seems to be reflected in the electrical response of the entire system. Therefore, using the electrical response of the system, not only is it possible to get information about the microchannel but also about its resonance frequency.

It was further observed that condition (1), air-filled channel, deviates from the results for the liquids (2)-(4) when considering the successively decreasing speed of sound and therefore theoretically decreasing resonance frequency in the channel. Without wishing to be bound by theory the present inventors note that one possible explanation could be that in condition (1) the spectrum does not contain any information about the resonance in the flow channel, i.e. the electrical response measured could represent only the electrical behavior of the bulk material. In any case this observation caused the present inventors to consider that spectra obtained for different liquids, not including air, could be more useful in obtaining information about the resonance in the channel.

The ordered deviations were mainly observed in devices whose geometry was defined by straight wall.

Based on the observed deviations, further study was performed as described in example 2 below Example 2—Towards Derivation of a Method of Determining A Resonance Frequency of an Acoustofluidic Device To carry on the investigation of the relation between the system electrical response and the flow channel resonance frequency, the correspondence between the deviations in the impedance spectra and the focusability results was studied.

Figure 3A:
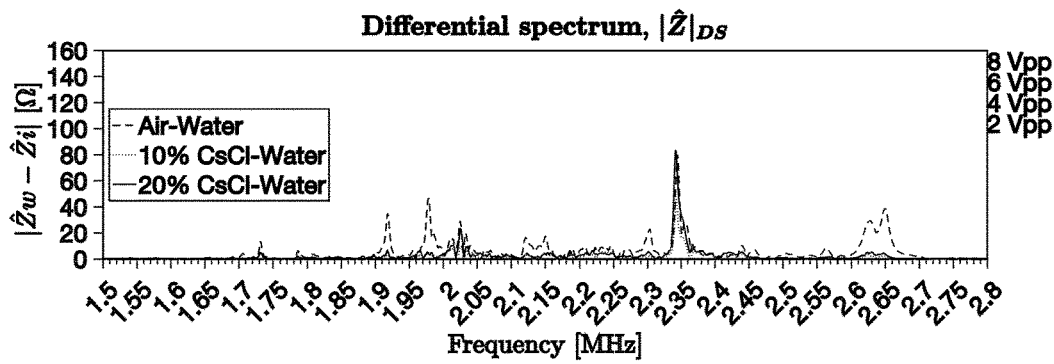
FIG. 3 shows differential impedance spectra obtained for test acoustofluidic devices A1-A3 together with the result of focusability studies.

This involved computing the differential spectra $|\hat{Z}|_{DS}$ for the tested devices and for the different conditions (1)-(4). Such spectra are shown in FIG. 3A for device A1. Three curves are shown: Air-water, 10% CsCl—water, and 20% CsCl—water (as described above the impedance for water was used as reference)

At frequencies where the spectra of air, water, 10% CsCl and 20% CsCl overlap and thus there is a small or no difference between the complex-valued impedances, the curves in $|\hat{Z}|_{DS}$ are close to zero. However, the differences become greater at frequencies where the spectra deviate from each other. In particular, at a deviation, $|\hat{Z}|_{DS}$ increases from zero, reaches a maximum and then, when the spectra overlap again, it goes back to zero. In this way what will be referred to as a peak, e.g., at 2.35 MHz in FIG. 3A, is formed.

In particular, there is one region in the impedance spectra of FIG. 3A where the spectra of 10% CsCl, 20% CsCl and air deviate significantly from water, e.g., around 2.35 MHz. This region will be referred to as the main deviation.

Here it was observed that, spectra for air show several high peaks, whereas the spectra for the liquids show only one main peak at the main deviation.

Figure 3B:
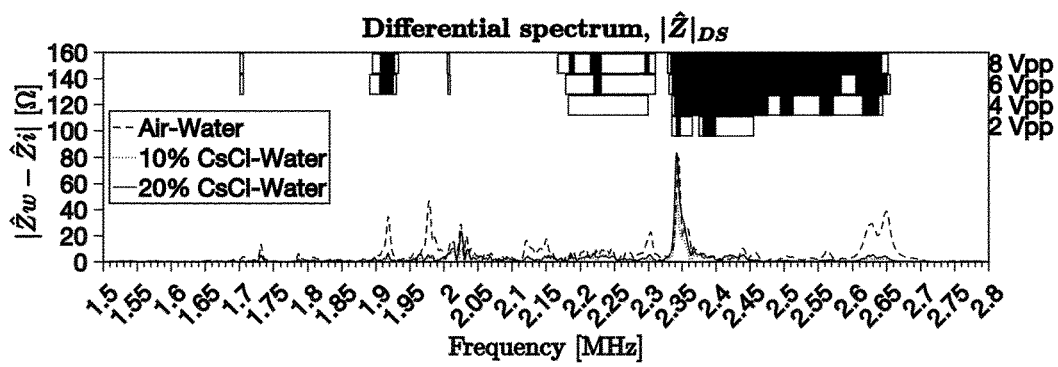
Figure 3C:
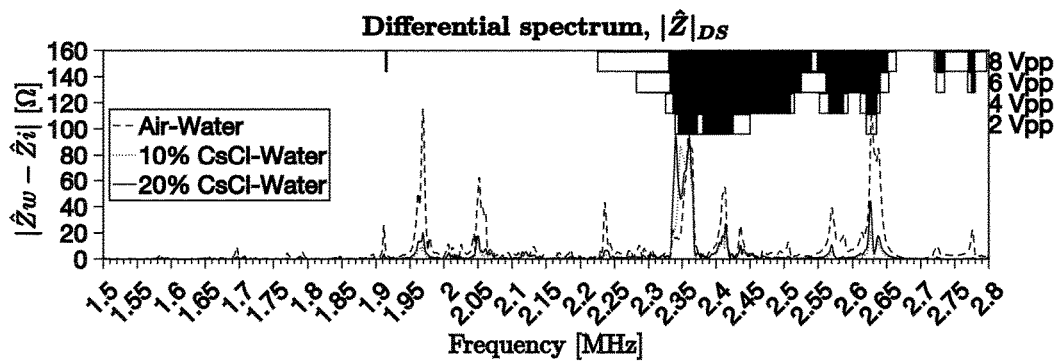
Figure 3D:
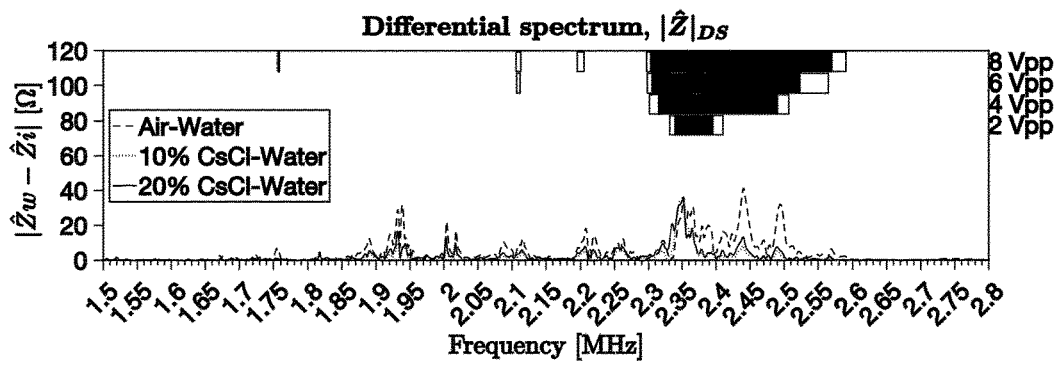

Next the results of the focusability experiments were compared to the peaks in the $|\hat{Z}|_{DS}$. FIG. 3B-D shows the focusability results in the spectra $|\hat{Z}|_{DS}$ for the devices A1-A3.

As can be deduced from the figures the frequencies at which focusing was obtained correlate well with the highest peaks in the spectra $|\hat{Z}|_{DS}$ for the liquids 10% CsCl and 20% CsCl.

More specifically, at 2 Vpp perfect focusability (black bands) is always found at the peak in correspondence of the main deviation where all the three differences (water and air, water and 10% CsCl and water and 20% CsCl) are large, e.g., the peak at 2.35 MHz. This peak will be referred to as the main peak. Moreover, increasing the set peak-to-peak voltage amplitude to 4 Vpp, 6 Vpp and 8 Vpp, the region of perfect focusability widens covering more frequencies around the main peak.

The spectra for air includes a peak at frequencies where focusing was observed, however additional high peaks are also included at frequencies where focusing was not observed, such as at 1.98 MHz in FIG. 3b and at 1.97 MHz and 2.05 MHz in FIG. 3C.

These results show that there is a relation between the peaks in the $|\hat{Z}|_{DS}$, and thus the deviations in the spectra, and the resonance of the flow channel. Moreover, there seems to be a difference between the information given by the difference between air and water and the difference between CsCl solutions and water. In particular, the differences between CsCl solutions and water seem to match perfectly with the focusability results: they show one main peak where perfect focusing is found at the lowest voltage and, increasing the voltage amplitude, focusing is found also where smaller peaks are located. In contrast the difference between water and air does not seem to give clear information.

Figure 4A:
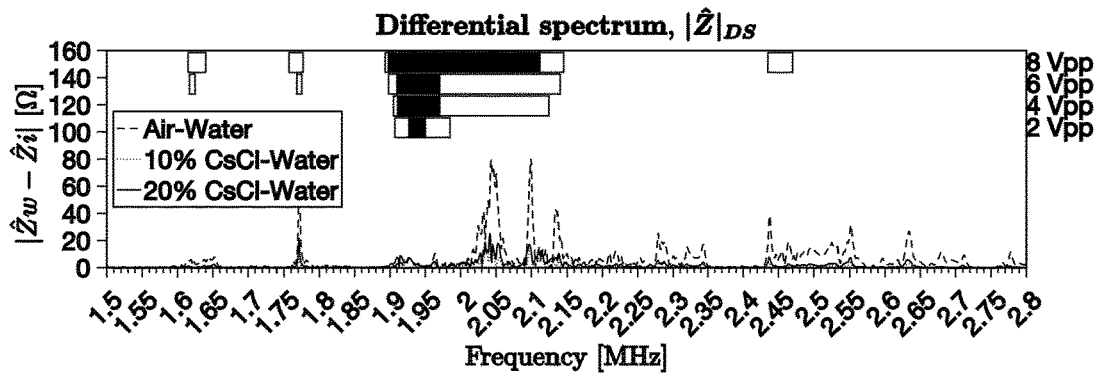
FIG. 4 shows differential impedance spectra obtained for test acoustofluidic devices B1 and C1 together with the result of focusability studies.
Figure 4B:
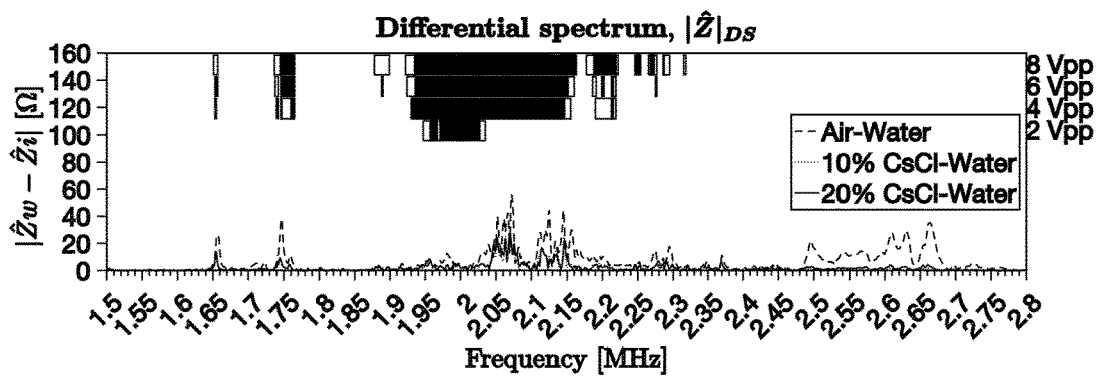

Similar studies were made for devices of type B and C, as shown in FIG. 4A (device B1) and FIG. 4B (device C2). Here the correspondence between the focusability results and the peaks is not as good as for the devices of type A: perfect focusability at 2 Vpp is not found at the main peaks where all the three differences (water and air, water and 10% CsCl and water and 20% CsCl) are large. In FIG. 4A focusing would be expected around the large peaks at 1.77 MHz or 2.05 MHz, whereas focusing was instead around 1.94 MHz, where there are only small peaks.

Figure 5A:
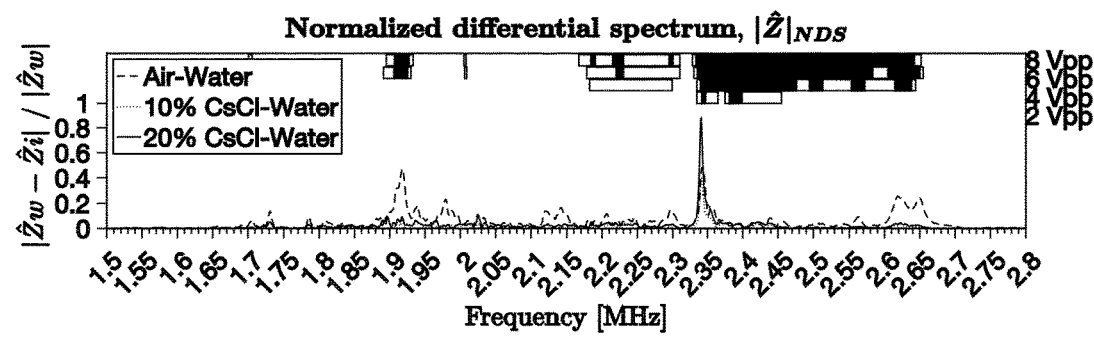
FIG. 5 shows normalized differential impedance spectra for test acoustofluidic devices A1-A3, B1-B4, C1-C2 together with the result of focusability studies.
Figure 5B:
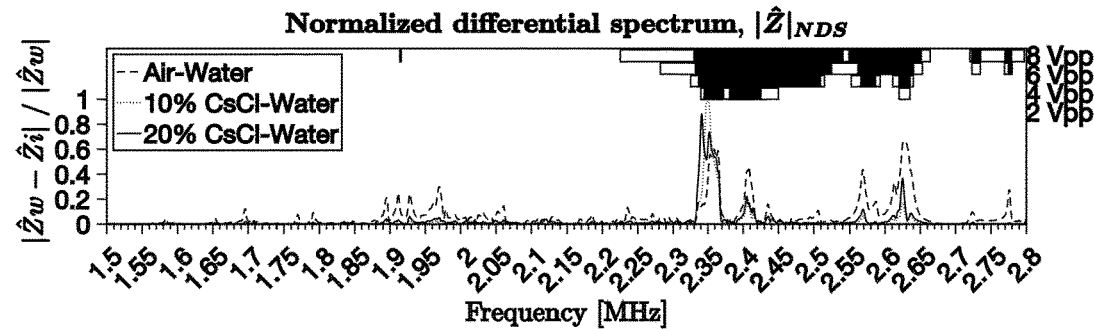
Figure 5C:
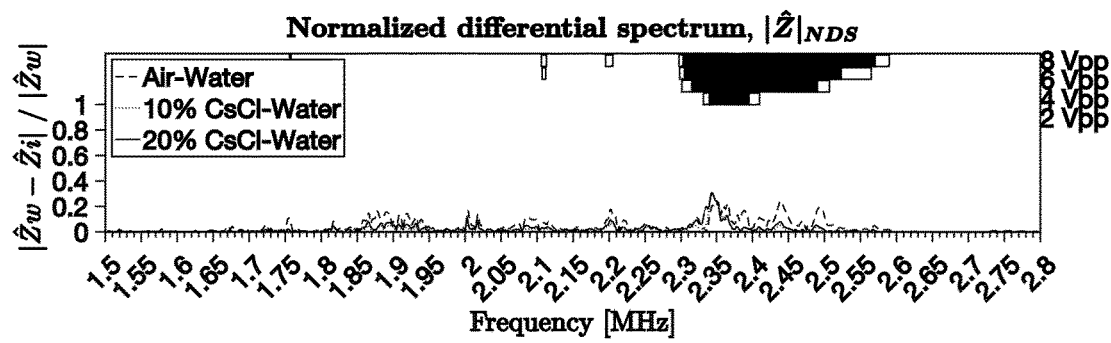

A normalization was performed, by computing and plotting the normalized differential spectrum $|\hat{Z}|_{NDS}$ for the devices. The normalization rescales the height of the peaks according to the complex valued impedance for water. FIGS. 5A-C show the results for the devices A1-A3. As can be seen the normalized difference spectra retain their ability to predict focusability corresponding to the main peaks in the spectra.

Figure 5D:
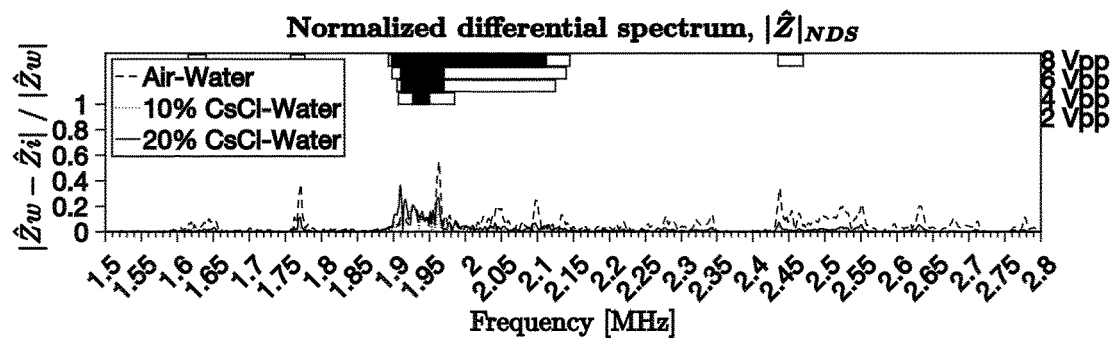
Figure 5E:
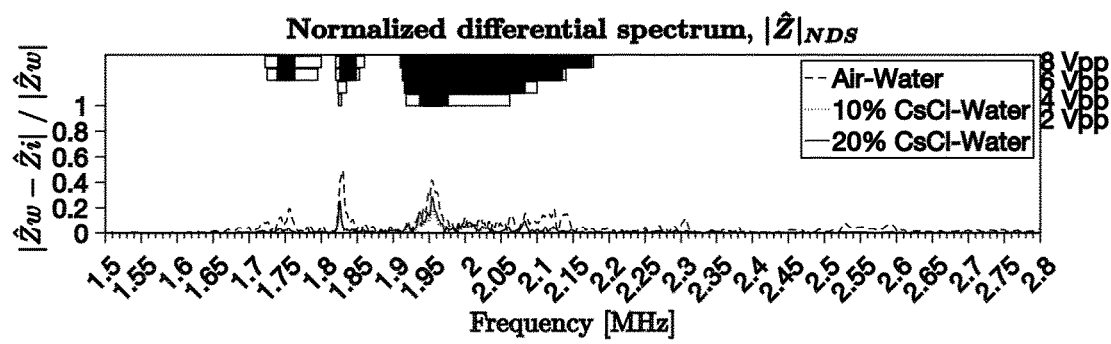
Figure 5F:
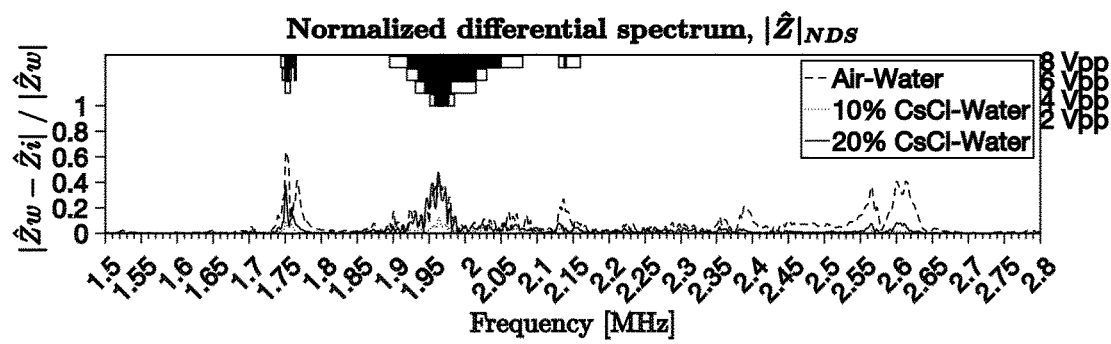
Figure 5G:
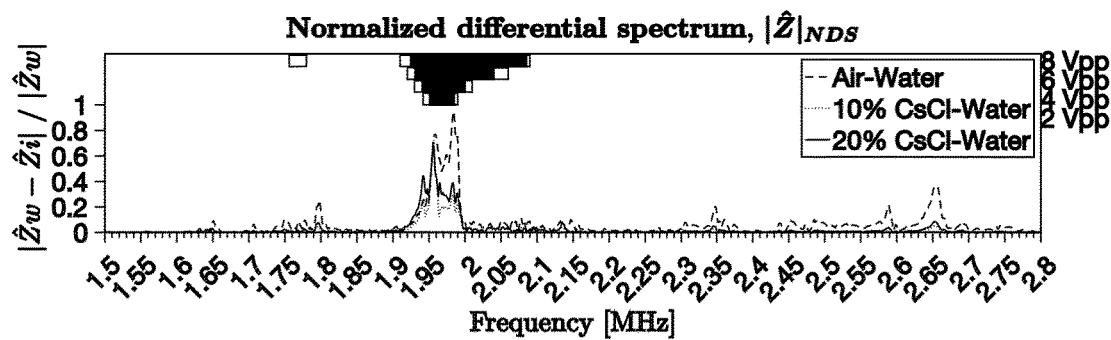
Figure 5H:
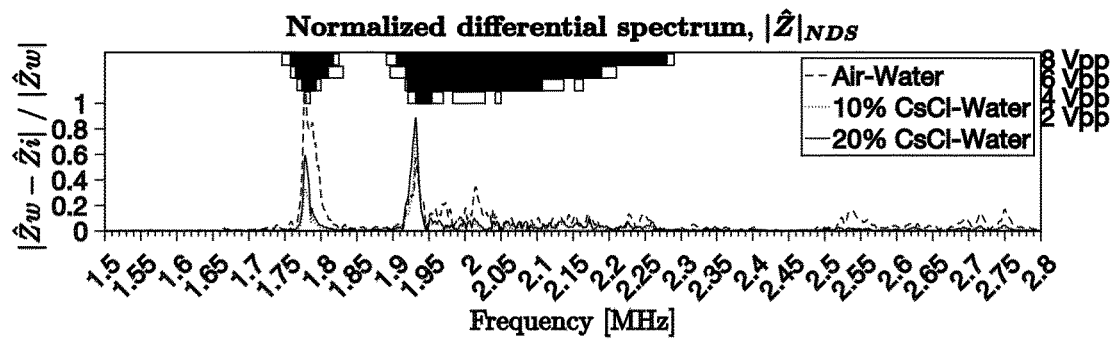
Figure 5I:
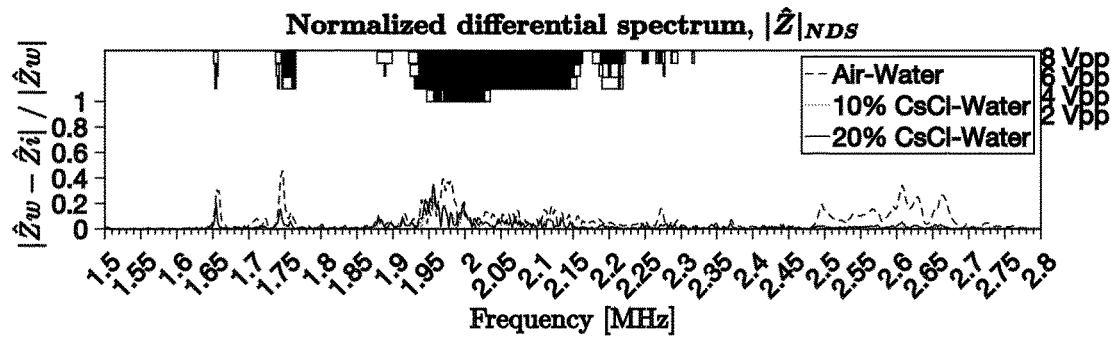

When the normalization was applied to differential spectra for the devices of type B and C a clear improvement was seen as shown in FIG. 5D (device B1), FIG. 5E (device B2), FIG. 5F (device B3), FIG. 5G (device B4), FIG. 5H (device C1) and FIG. 5I (device C2). Notably devices of type B and C were fabricated from wafers with different orientation of the silicon crystals however the figures show that this does not affect the usability of the method.

In summary the results shown in FIGS. 5A-5I show that in a normalized differential spectrum $|\hat{Z}|_{NDS}$ for the CsCl solutions the most significant peak corresponds to perfect focusing at the lowest voltage amplitude 2 Vpp.

Figure 5J:
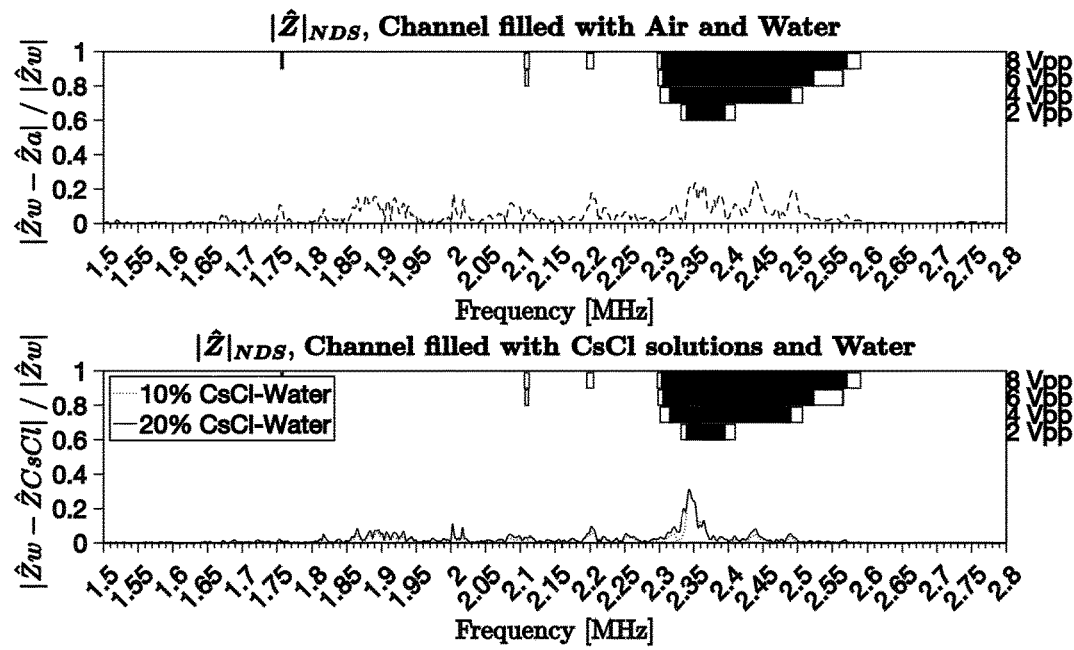

It was further noted that unlike the difference between air and water, the difference between the CsCl solutions and water always shows one main peak and a few smaller ones. All the peaks of the $|\hat{Z}|_{NDS}$ of the difference between water and the CsCl solutions match with the focusability results see for example FIG. 5J showing the results for air separate from the results for the CsCl solutions for the device A3.

Accordingly, a method for determining or predicating a resonance frequency (corresponding to an actuation frequency that will provide focusing of particles) of the channel could be tentatively defined to include the steps of:

a) collecting impedance and phase spectra in two different conditions, i.e. when two different liquids l1 and l2 (e.g. 20% CsCl and water) (which could be provided in separate steps) which differ at least by the speed of sound (i.e. py acoustophysical properties such as by differing by density and/or compressibility) are provided in the channel, b) comparing the impedance spectra, by for example computing the normalized differential spectrum $|\hat{Z}|_{NDS}$:

$$|\hat{Z}|_{NDS}=|\hat{Z}_{l1}-\hat{Z}_{l2}|/|\hat{Z}_{l1}|$$

c) obtaining one or more predicted resonance frequencies of the channel at the frequency corresponding to the most significant peak or peaks in said spectrum.

Figure 6A:
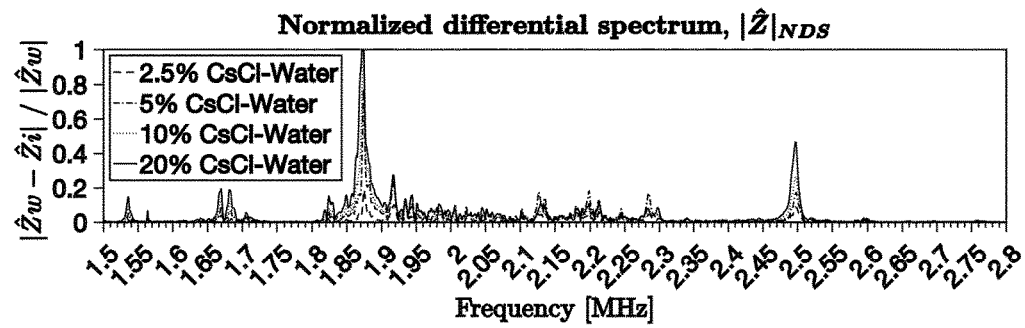
FIG. 6 shows normalized differential impedance spectra for test acoustofluidic device L1 obtained at different concentrations of CsCl, and normalized differential impedance spectra for test acoustofluidic device A1 obtained on different days, as well as where the two liquids are CsCl-solutions with different concentration.

As shown by the results in FIG. 5 this method works with different acoustofluidic devices. FIG. 6A further shows that it works with different concentrations of the CsCl solutions here investigated using the L device. With decreasing concentration of CsCl the main peak becomes lower and thinner, yet the peak remains capable of predicting the resonance frequency.

Figure 6B:
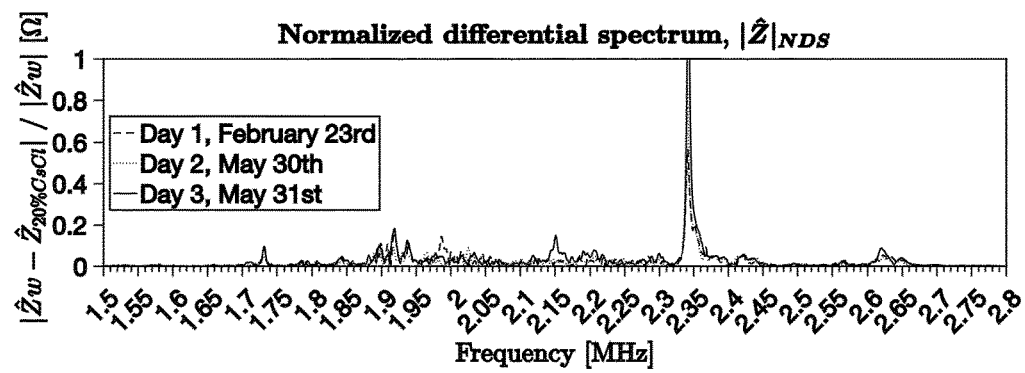

The method is also reproducible as shown by FIG. 6B showing the $|\hat{Z}|_{NDS}$ of device A1 at three different points in time for the difference between 20% CsCl solution and water. As seen there is no significant variation.

Figure 6C:
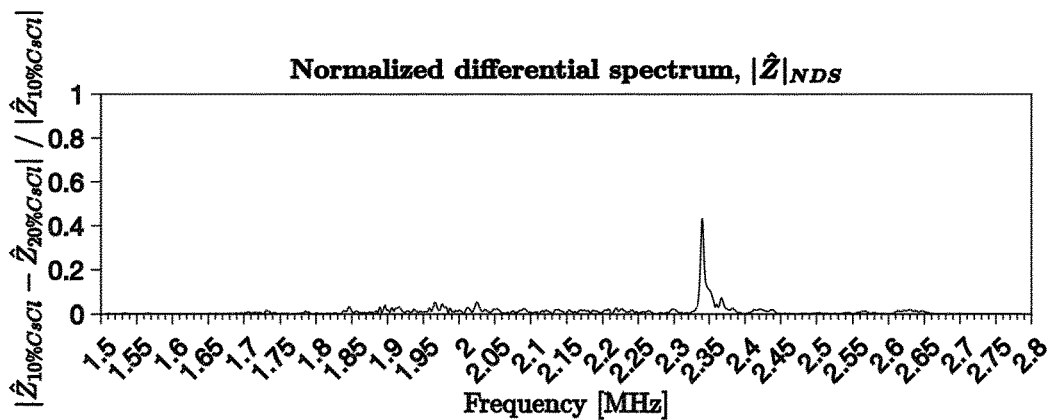

In addition, FIG. 6C shows that the method can be performed without any of the liquids being water. Here the liquids used are a 20% CsCl solution and a 10% CsCl solution and the device tested is the A1 test device. A main peak forms at the same position as in the results for the liquids 20% CsCl solution and water shown in FIG. 6B.

This method was further explored in the following final example.

Example 3—Evaluation of the Method of Determining a Resonance Frequency of an Acoustofluidic Device Finally a number of tests were made on further devices including more complex chip designs that are usually used in lab-on-a-chip applications (devices of type F-K).

Successively, the method was tested also on glass-glass chips (devices of type L).

Figure 7A:
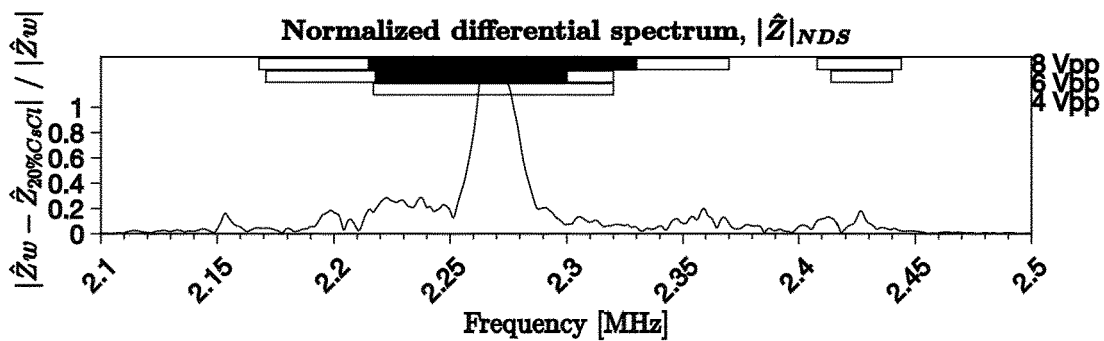
FIG. 7 shows normalized differential impedance spectra for test acoustofluidic device D, F, G, H1, H2, L1, L2, and L3 together with the result of focusability studies.

FIG. 7A shows the result for device D (silicon with a glass lid with a smaller thickness than used for devices A-C. The main peak perfectly predicts the frequency to use for perfect focusing.

Figure 7B:
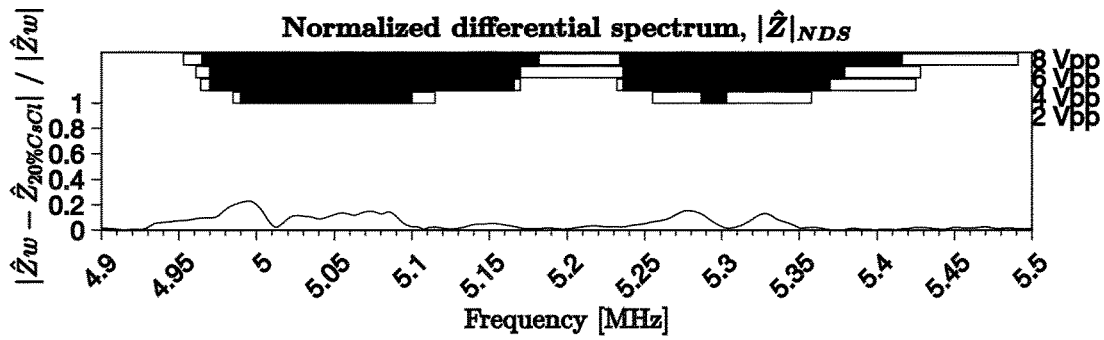
Figure 7B:
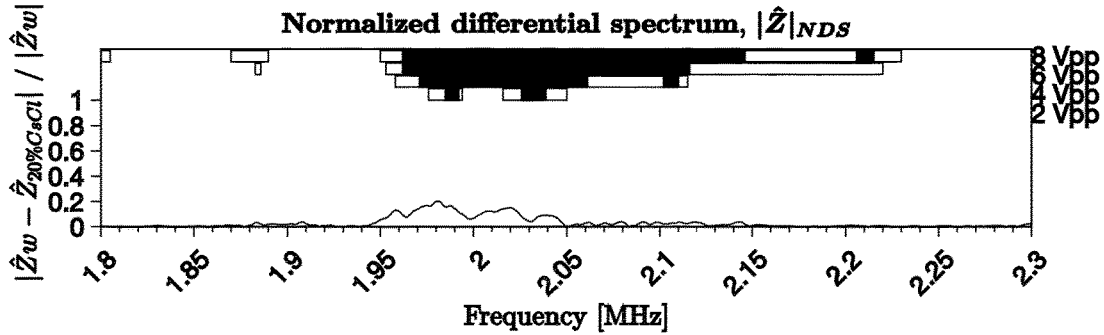

FIG. 7B shows the result for device F which includes two piezoelectric transducers (5 MHz and 2 MHz).

Figure 7C:
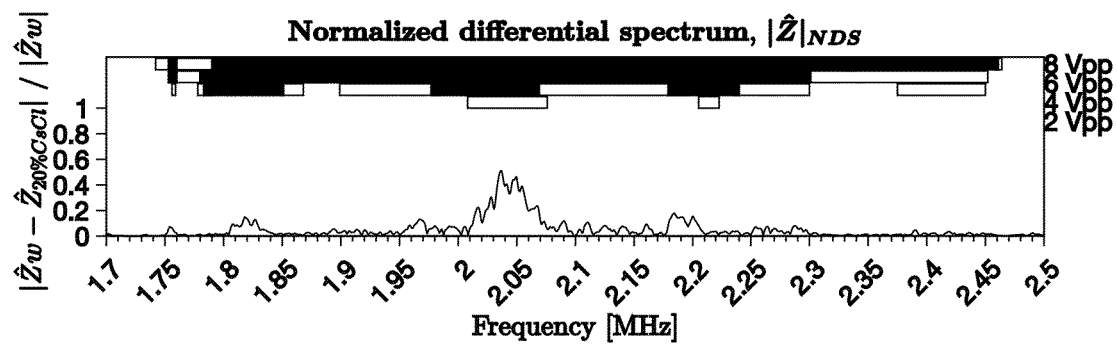

FIG. 7C shows the results for device G.

Figure 7D:
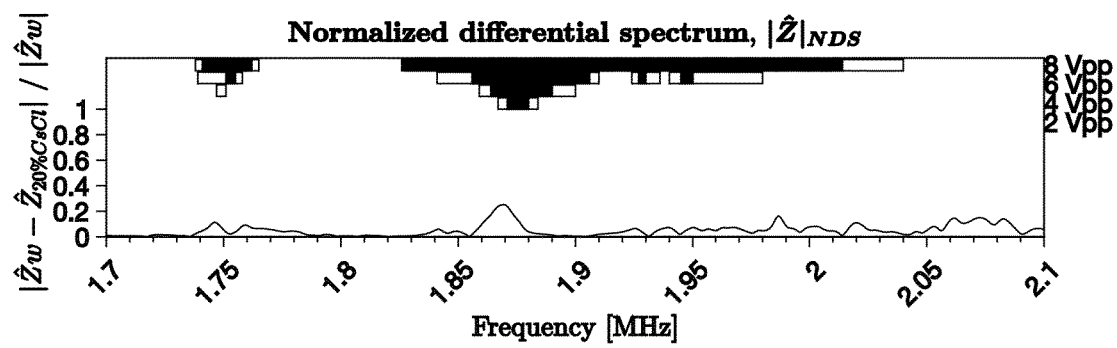
Figure 7E:
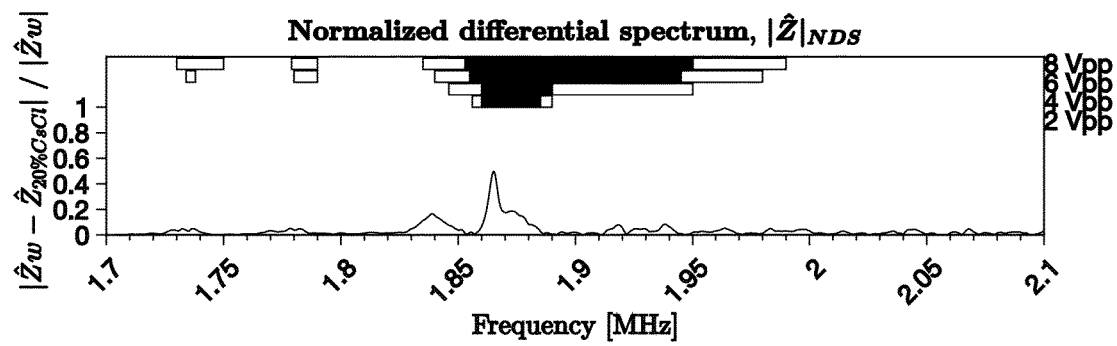

FIGS. 7D and 7E shows the results for devices H1 and H2.

Figure 7F:
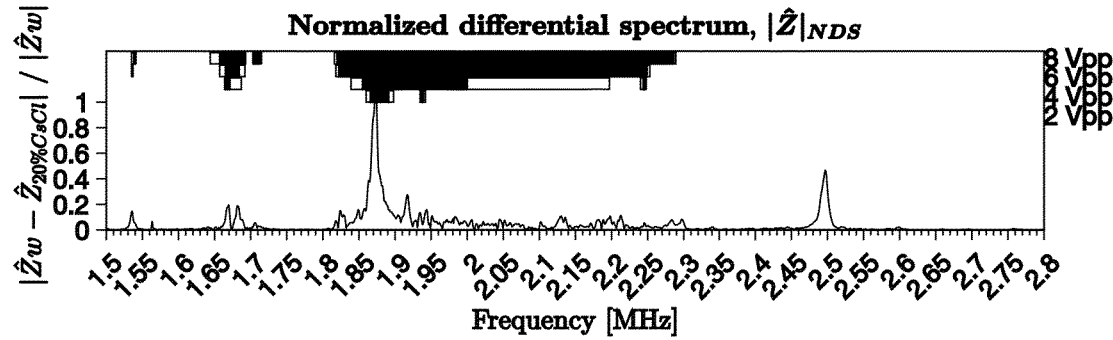
Figure 7G:
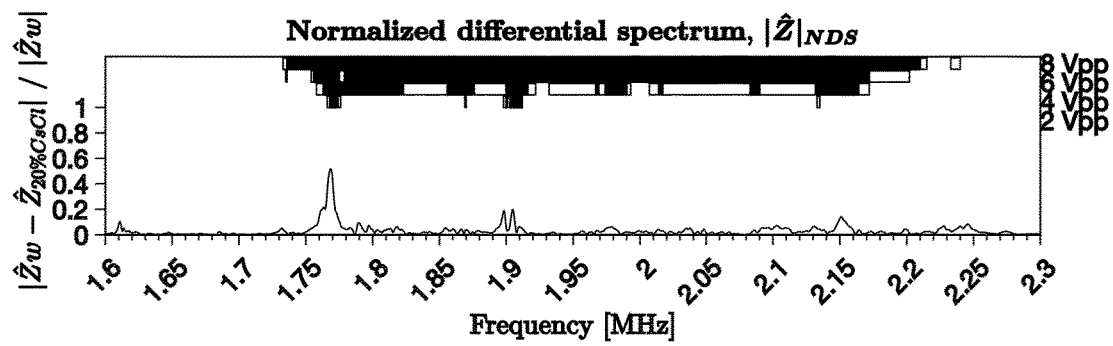
Figure 7H:
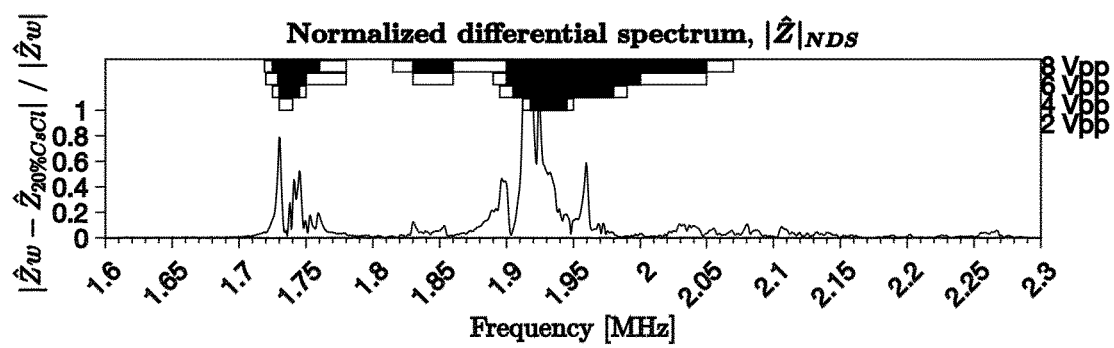

FIG. 7F-H show the results for the devices L1-L3.

It should be noted that the method performs well both for silicon-glass devices and glass-glass devices (device L). For spectra where the main peak does not result in perfect focusing at 2 Vpp a simple increase of the voltage amplitude to 4 pr 6 Vpp yields perfect focusing. By consequently selecting the frequency corresponding to the most significant i.e. highest peak, focusing can be obtained, see for example the results for device L1.

The advantage of the method is in particular evident from the results for the devices D and F-J where the expected channel resonance computed by taking into account the width and height of the channel does not match the resonance where focusing occurs and which is predicted by the method. For example, the expected frequency in device D is around 2.482 MHz based on the channel width given in table 1 and the speed of sound taken from table 3, whereas perfect focusability occurs at approx. 2.275 MHz.

Figure 8A:
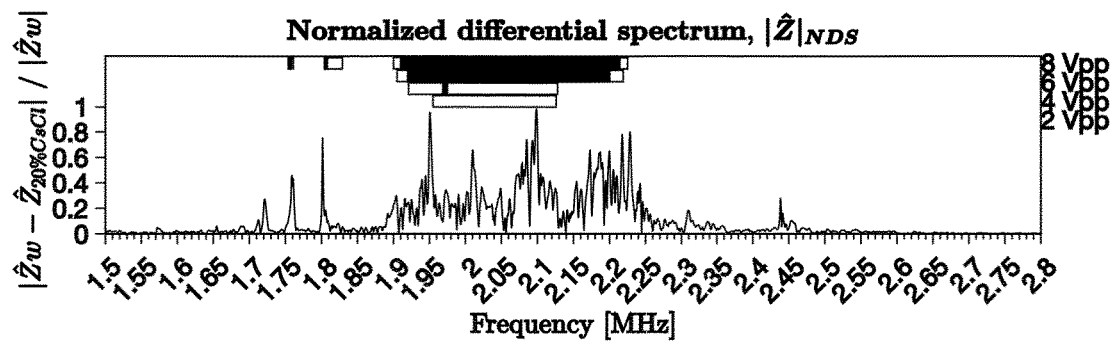
FIG. 8 shows normalized differential impedance spectra for test acoustofluidic device B5, B6, I, J, and K together with the result of focusability studies.

In some cases the spectra obtained by the method included strong deviations resulting a multitude of significant peaks. This was for example the case with the device B5 and could be due to many factors such as deviations in dimension introduced during manufacturing. Still, selection of the highest peak yield focusing if the Voltage amplitude is increased, see FIG. 8A showing the result for device B5.

Figure 8B:
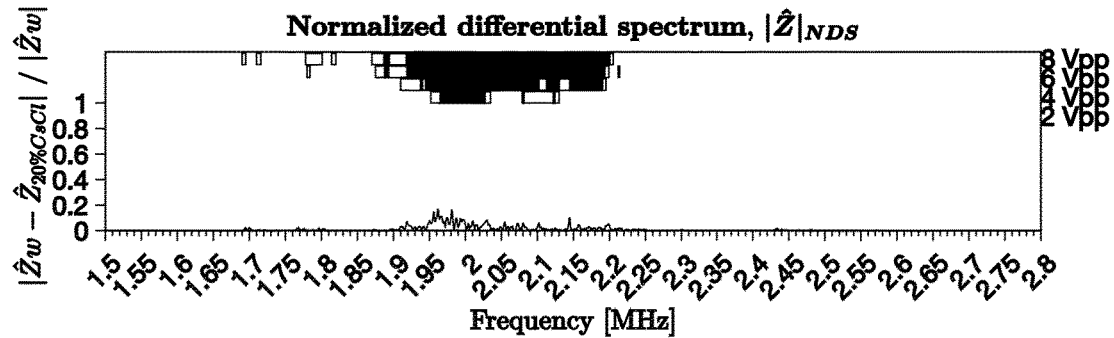
Figure 8C:
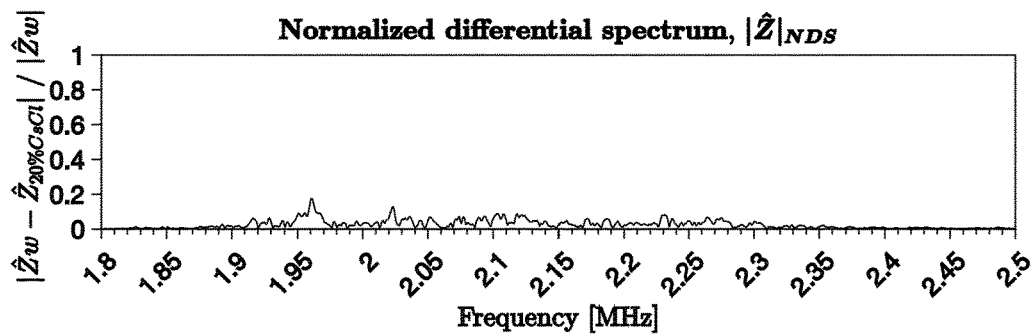
Figure 8D:
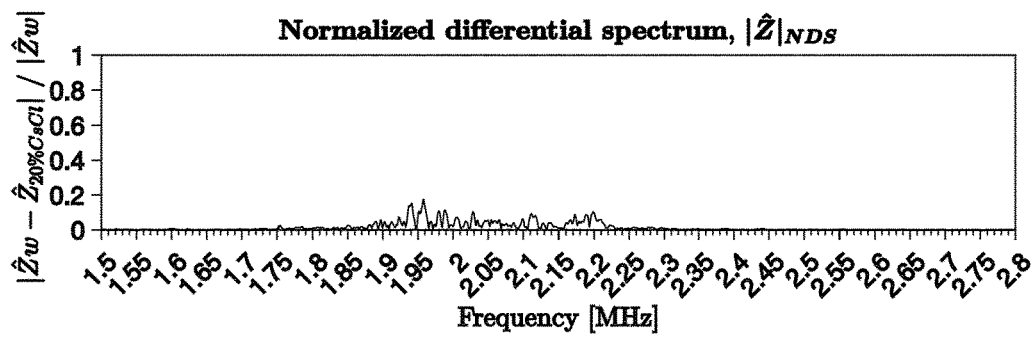
Figure 8E:
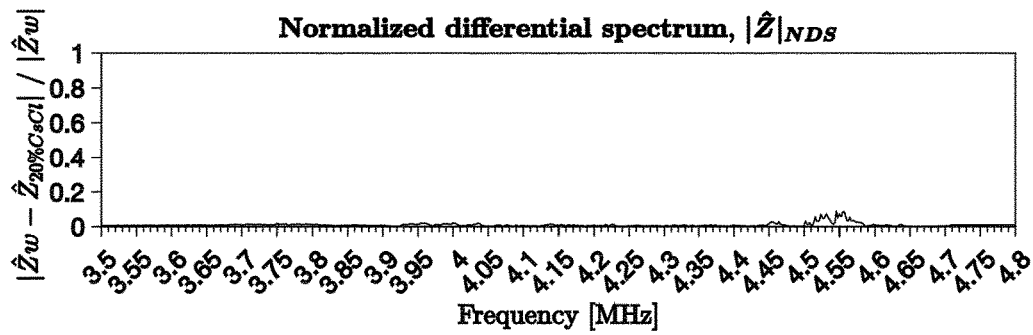

In other cases the spectra did not include any significant peaks. This was the case for device B6, as shown in FIG. 8B. Still the spectrum show a region of many minor peaks—increasing the voltage for a frequency within this region eventually yielded focusing. The latter also applied to the devices I, J and K, see FIGS. 8C-8E. This phenomenon could be due to the channels in these devices being so small in contrast to the remainder of the structure that the channel behavior is hidden by the entire system behavior. The device including the lid could be large (i.e. comprise a large amount of bulk material) compared to the channel, the piezoelectric transducer could be larger or wider than the device, etc. As with device B6 also device I, J and K will show focusing when the voltage is increased for a frequency within the region of peaks.

Figure 8F:
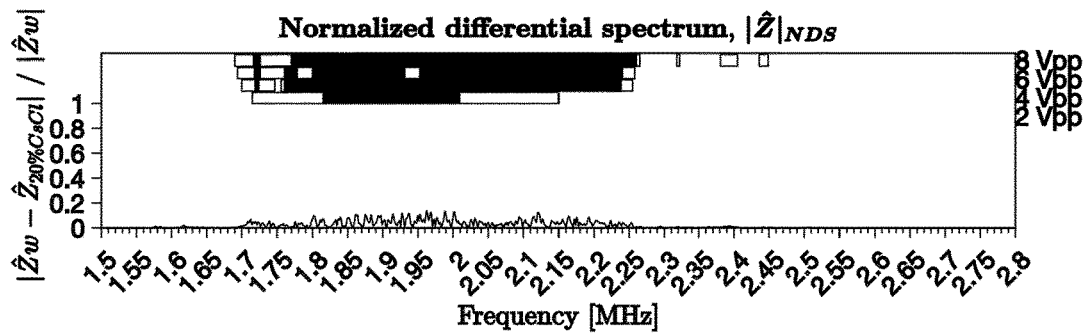
Figure 8G:
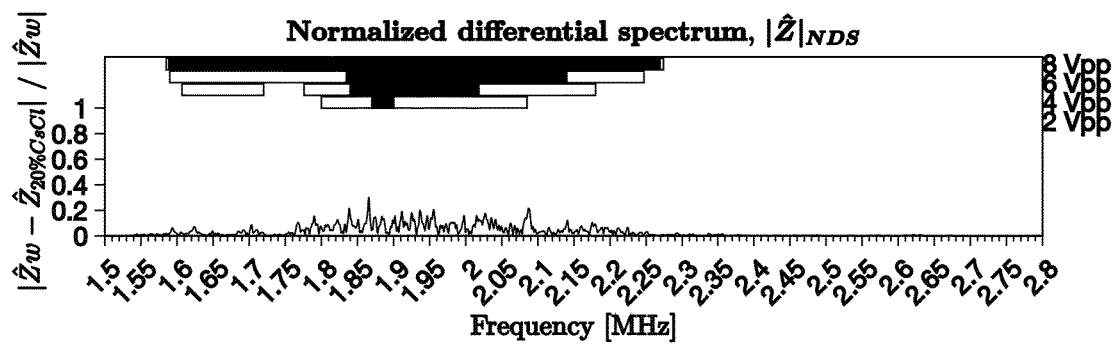

A study was also performed to analyze how reduction of the amount of bulk material affected the performance of the method. This study was performed on devices of type E in which air-channels are provided adjacent the channel. The results are shown in FIGS. 8F (device E1) and 8G (device E2). Device E1 and E2 are similar to devices B5 and B6 and derive from the same silicon wafer, thus while no clear main peak appear in FIGS. 8D and 8E the regions of perfect focusability has increased and it is noted that the method still provides a useable resonance frequency although the voltage amplitude needs to be increased when the device is actuated with ultrasound at the frequency predicted by the method.

Figure 9:
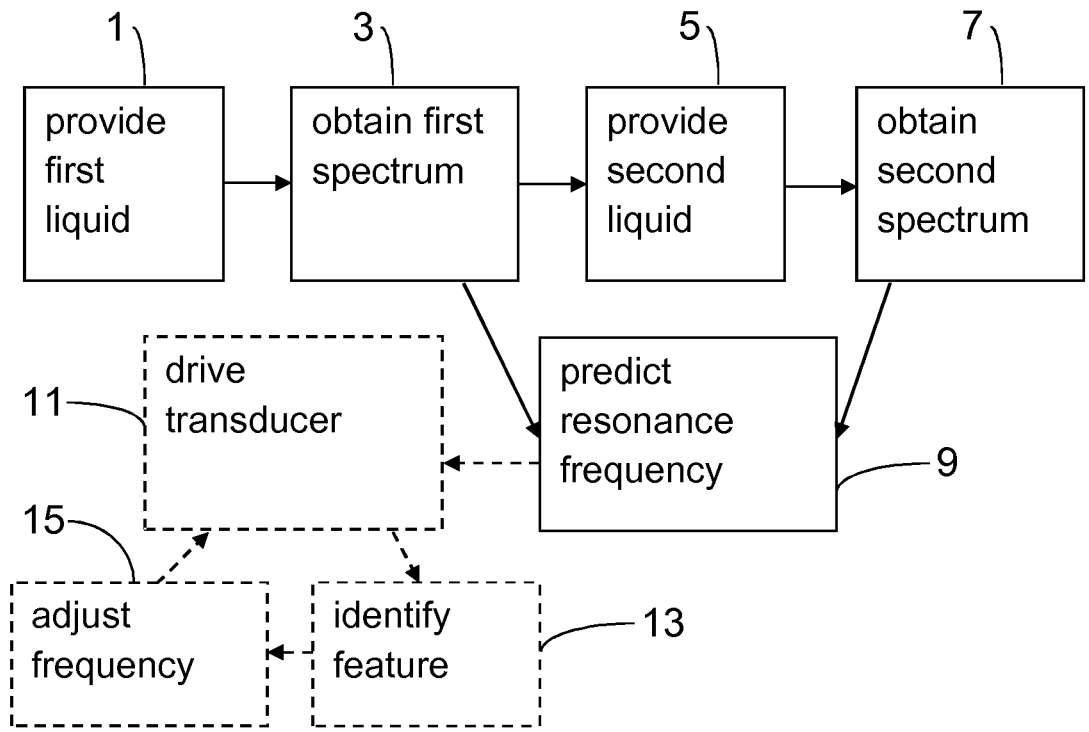
FIG. 9 shows a flow sheet for the methods according to the first and second aspects of the present invention.

A general flow sheet of the method according to the first aspect of the present invention is shown in FIG. 9 showing the steps of providing 1 a first liquid filling the cavity, obtaining 3 a first impedance spectrum, by measuring the electrical impedance of an ultrasound transducer connected to the acoustofluidic device as the transducer is driven at a range of frequencies to supply ultrasound energy to the acoustofluidic device with the first liquid filling the cavity, providing 5 a second liquid filling the cavity, wherein the second liquid differs from the first liquid in its acoustophysical properties, such as in the speed of sound, obtaining 7 a second impedance spectrum, by measuring the electrical impedance of the ultrasound transducer as the ultrasound transducer is driven at the range of frequencies to supply ultrasound energy to the acoustofluidic device with the second liquid filling the cavity, and predicting 9 the one or more resonance frequencies for efficient operation of the acoustofluidic cavity by comparing the first and second impedance spectrum and selecting the one or more frequencies where the absolute value of the difference between the spectra, normalized by the absolute value of one of them, is largest.

The method according to the second aspect of the present invention further includes driving 11 the ultrasound transducer of the acoustofluidic device with:
  a. at least one frequency within 90% to 110% of one or more of the predicted resonance frequencies, or
  b. a frequency sweep encompassing a frequency within 90% to 110% of one or more of the predicted resonance frequencies, and may additionally include the steps of identifying 13 a feature, such as a peak or dip, in an electrical impedance spectrum of the ultrasound transducer, the feature being present at the one or more predicted resonance frequencies, and repeatedly adjusting 15 the at least one frequency or the frequency sweep based on following the position, in terms of frequency, of the feature, if the position changes.

Figure 10:
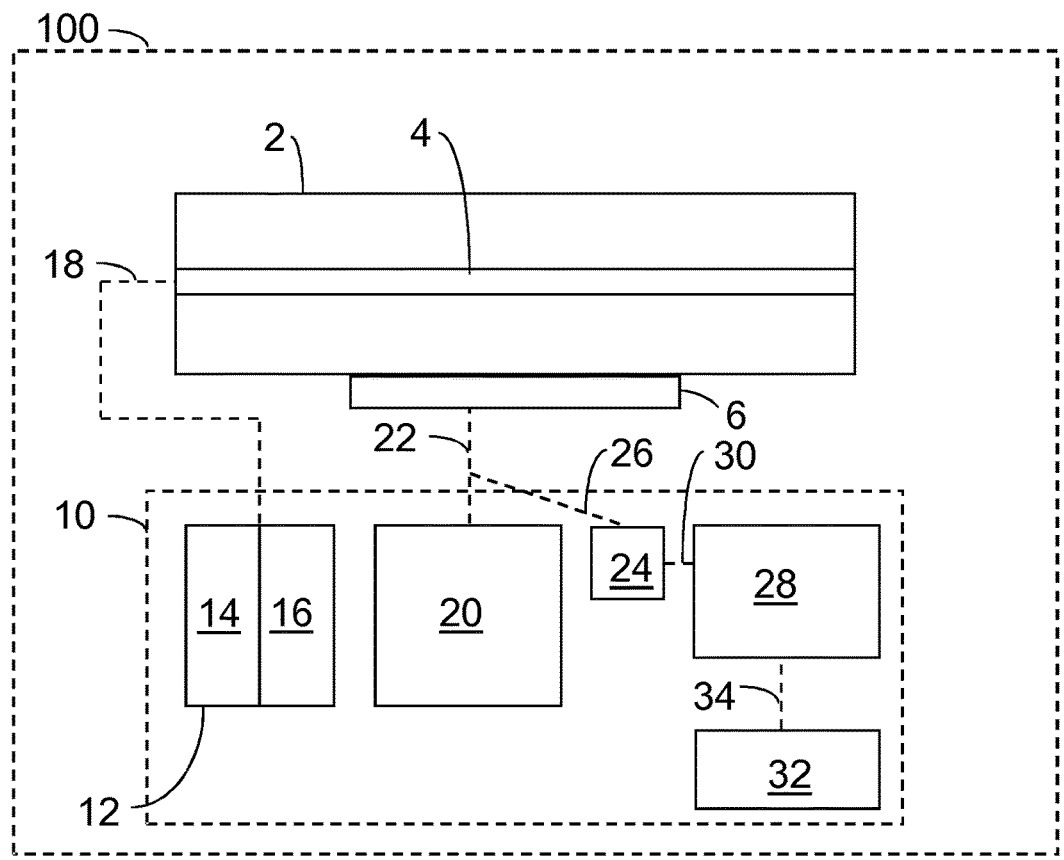
FIG. 10 shows apparatuses according to the third and fourth aspects of the present invention.

FIG. 10 shows apparatuses according to the third and fourth aspects of the present invention.

An apparatus 10 for predicting one or more resonance frequencies for efficient operation of an acoustofluidic cavity 4 in an acoustofluidic device 2 are shown. The apparatus 10 comprises a device 12 configured to sequentially provide a first 14 and a second 16 liquid filling the acoustofluidic cavity, wherein the second liquid differs from the first liquid in its acoustophysical properties, such as in the speed of sound. The liquids may be provided via a tube or conduit 18. A drive unit 20 is configured to drive the ultrasound transducer 6 connected to the acoustofluidic device 2 at a range of frequencies to supply ultrasound energy to the acoustofluidic device 2. The drive unit 20 is connected to the ultrasound transducer 6 via wires 22. An impedance sensing unit 24 is electrically connected to the drive unit 20 and configured to obtain first and second impedance spectra, by measuring the impedance of the ultrasound transducer as it is driven over the range of frequencies, when the first 14, respective the second 16, liquid is provided filling the cavity 4. The impedance sensing unit 24 may be connected to the wires 22, or as here via wires 26, or alternatively be integrated with the drive unit 20. A computing device 28 is configured to predict one or more resonance frequencies for efficient operation of the acoustofluidic cavity by comparing the first and second impedance spectrum and selecting the frequencies where the absolute value of the difference between the spectra, normalized by the absolute value of one of them, is largest. The computing device 28 is connected to the impedance sensing unit 24 via wires 30, or alternatively integrated with it or vice versa. A recording device 32 may be included and be configured to record the one or more resonance frequencies determined by the computing device and associate it with the acoustofluidic device 2. The recording device may be connected to the computing device via wires 34.

An apparatus 100 configured to perform an acoustofluidic operation and comprising the apparatus 10 is also shown in FIG. 10.

Example 4—An Alternative Temperature Modulating Method of Determining a Resonance Frequency of an Acoustofluidic Device To further evaluate the influence of temperature, which influences acoustophysical properties of materials, a number of experiments were made.

4.1 Characteristics of Test Acoustofluidic Devices

The characteristics of the acoustofluidic devices used are listed in table 4 below:

TABLE 4

Characteristics of test acoustofluidic devices

| Device | Type [substrate-lid] | Channel width [μm] | comment |
|---|---|---|---|
| 1 | Silicon-glass | 300 | Straight channel, <100> orientation, see section 1.2 |
| 2 | Silicon-glass | 375 | Straight channel, <110> orientation, see section 1.2 |

TABLE 4-continued

Characteristics of test acoustofluidic devices

| Device | Type [substrate-lid] | Channel width [μm] | comment |
|---|---|---|---|
| 3 | Silicon-glass | 375 | Straight channel, <100> orientation, see section 1.2 |
| 4 | Silicon-glass | 375 | Straight channel, <100> orientation, see section 1.2 |
| 5 | Silicon-glass | 375 | Medium exchange type channel: trifurcated inlet-straight channel-trifurcated outlet, <100> orientation, see section 1.2 |
| 6 | Glass-glass | 410 | Straight channel, glass height 1.1 mm |
| 7 | Glass-glass | 410 | Straight channel, glass height 0.7 mm |

4.2 Experimental Setup

The acoustofluidic devices were set up and operated as described in section 1.3, with the addition of being placed in a chamber providing a controlled temperature.

4.3 Initial Results, Normalized Differential Spectra at Different Temperatures

Figure 11A:
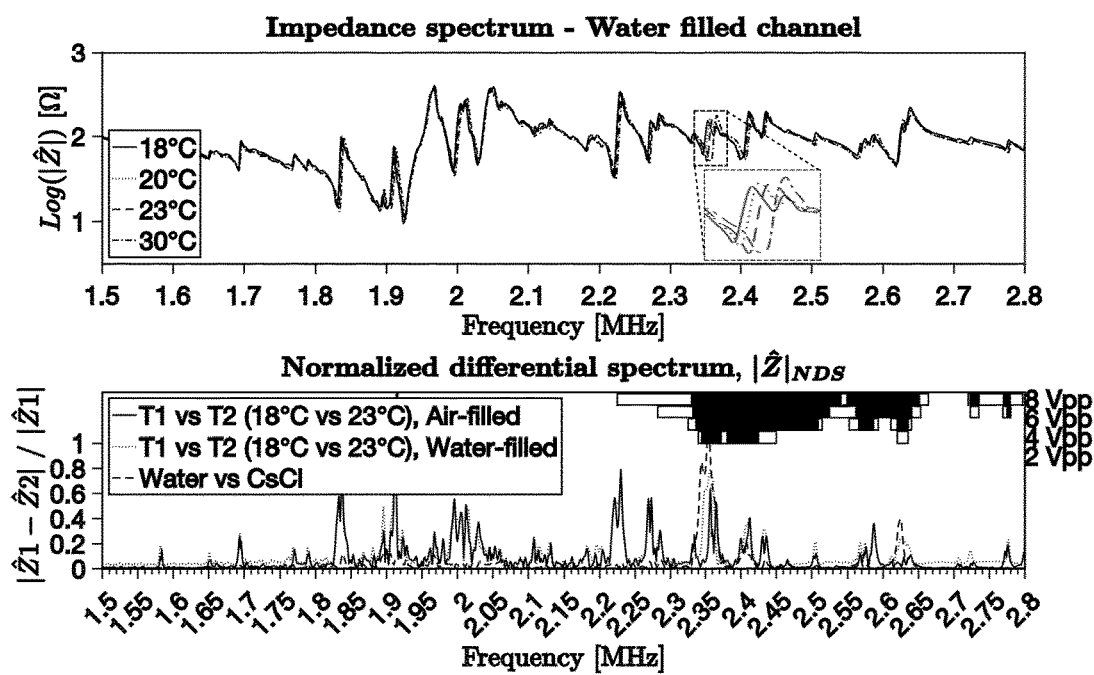
FIG. 11 shows impedance spectra of for the channel filled with water at different temperatures, normalized differential impedance spectra at difference temperatures for the acoustofluidic device with the channel filled with water or air, the normalized differential impedance spectra with the channel filled with water or CsCl-solution, and the observed resonance frequencies for efficient operation of the acoustofluidic device.
Figure 11B:
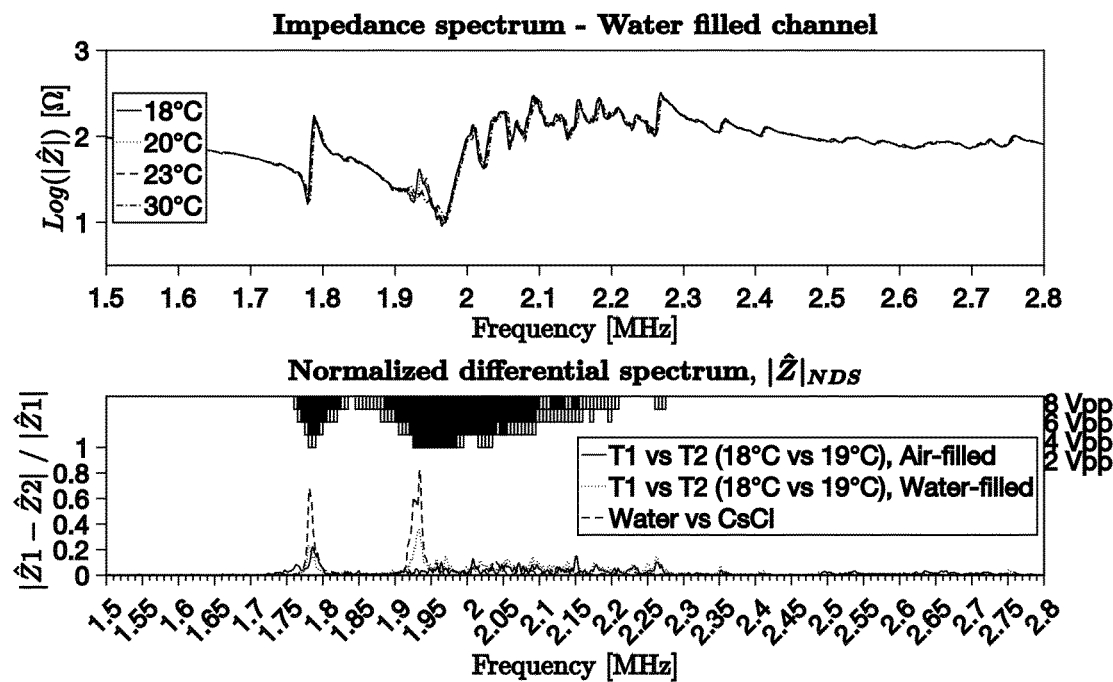
Figure 11C:
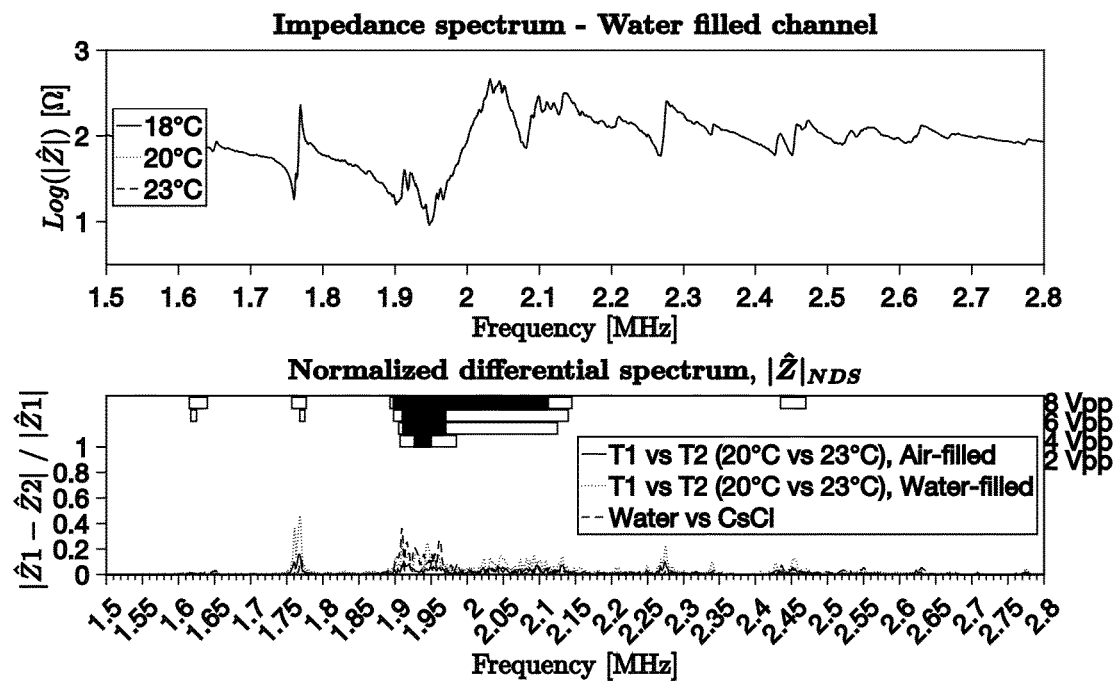
Figure 11D:
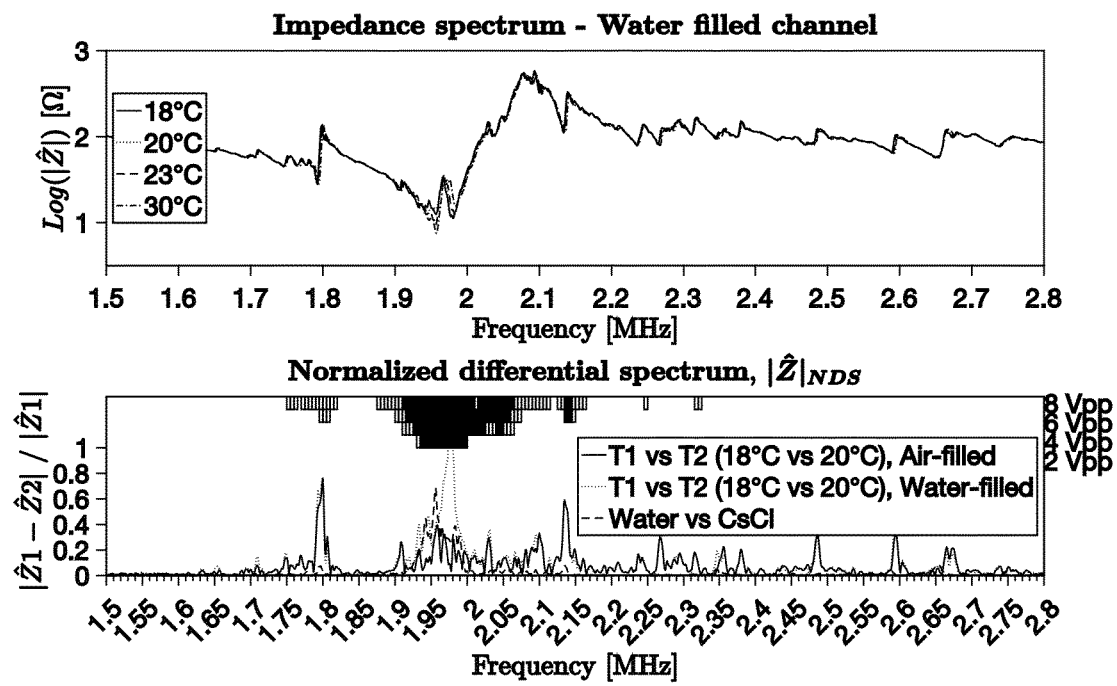
Figure 11E:
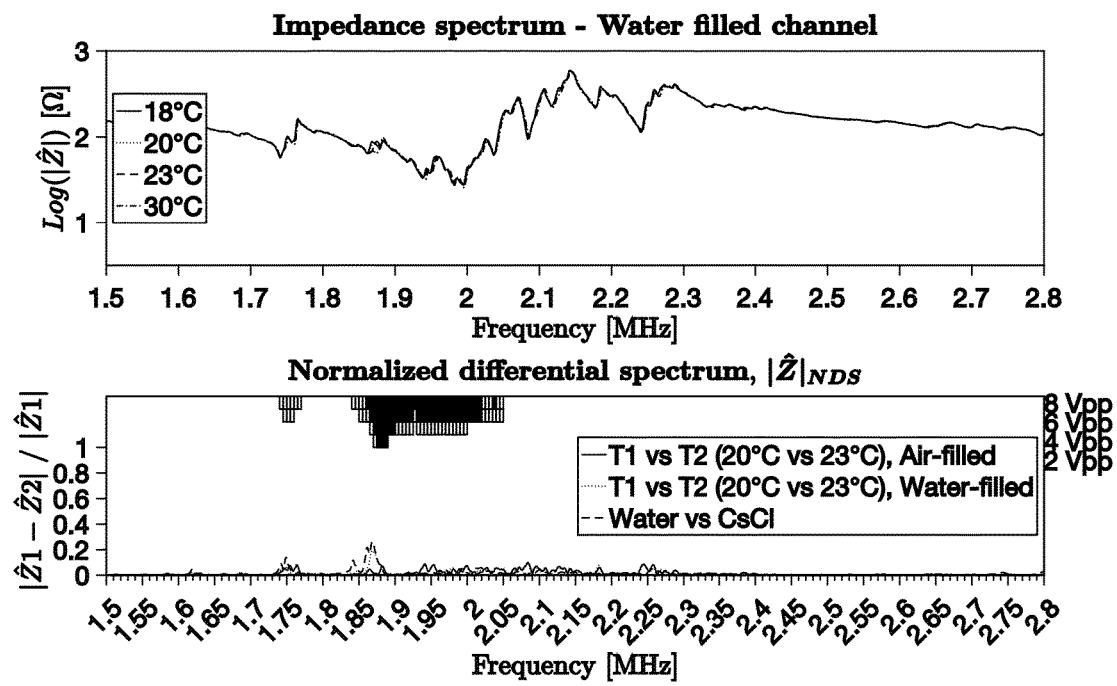
Figure 11F:
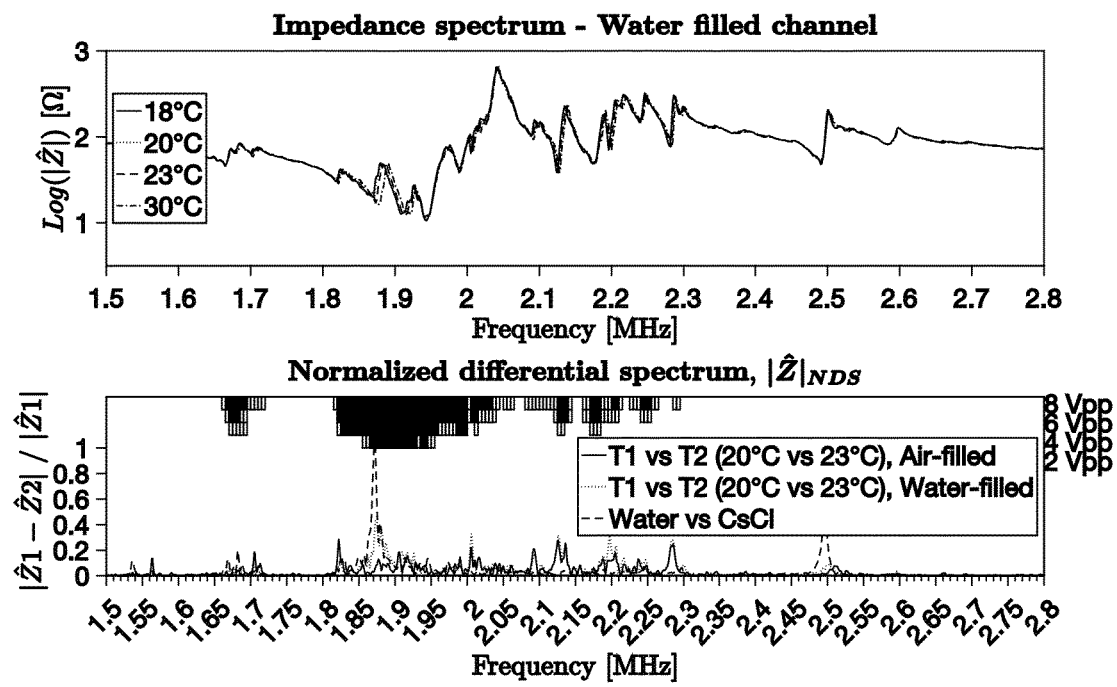
Figure 11G:
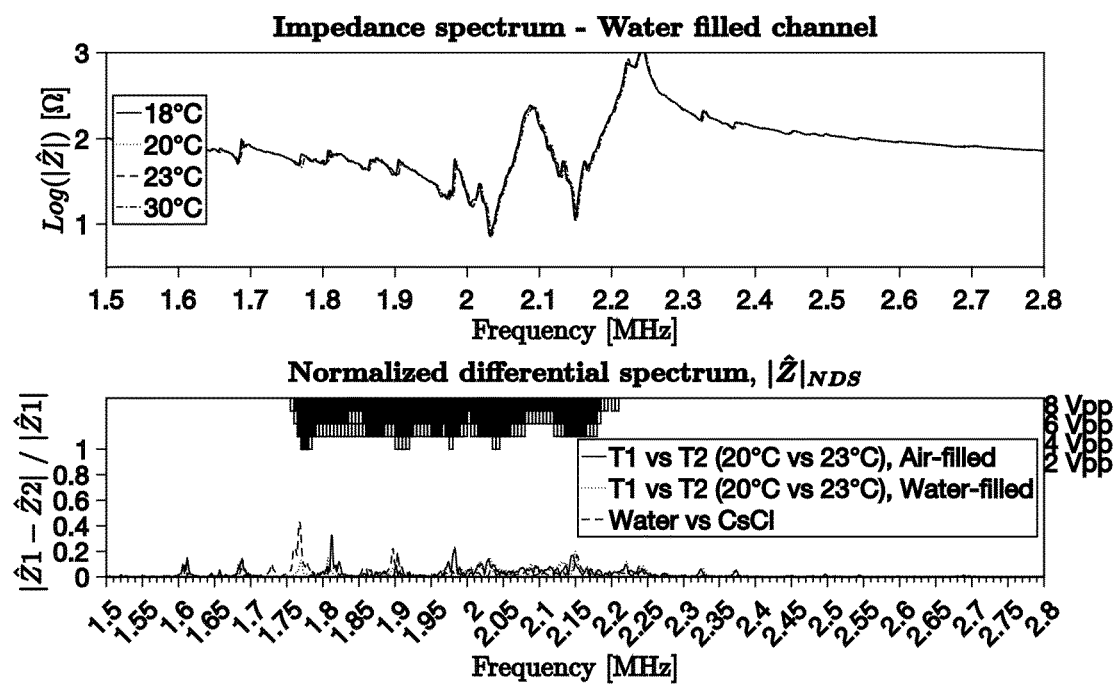

FIG. 11A in the upper graph shows the impedance spectra for device 1 with the channel filled with water at the temperatures 18, 20, 23, and 30° C. As seen there is a shift of the spectra as the temperature changes (magnification). The lower graph shows the normalized differential spectrum of the acoustofluidic device with the channel filled with air (18° C. vs 23° C.), water (18° C. vs 23° C.), and water vs CsCL-solution (20 wt %) (as in example 3). Further shown in the graph is the observed frequencies for efficient operation of the channel at Vpp of 8 V (top bars), 6 V, 4V and 2V (bottom bars). As seen the peaks obtained for water vs CsCL-solution predicts the resonance frequencies as shown in Example 3, whereas the peaks of the normalized differential spectra for water and air at 18° C. vs 23° C. comprise a number of peaks not corresponding to the observed resonance frequencies.

The results for the other devices 2-7 are shown in FIG. 11B to FIG. 11G, respectively. All tested devices yielded similar results, e.g. a number of peaks in the normalized differential spectra for water and air not corresponding to the observed resonance frequencies, and/or not corresponding to the peaks in the normalized differential impedance spectrum obtained for water vs CsCL-solution.

At this point the present inventors realized that the normalized differential spectrum obtained at different temperatures when the channel was filled with air provided the resonance modes (i.e. frequencies) of only the bulk, i.e. only the microfluidic device itself with no peaks at the channel resonance frequency. It was then observed that the normalized differential spectrum obtained at different temperatures when the channel was filled with water differed from when the channel was filled with air, and therefore this spectrum could provide the resonance modes of the microfluidic device together with the water filled channel.

Accordingly it was realized that comparing these two normalized differential spectra could allow distinguishing the resonance modes of the channel itself, and thereby allow a prediction of the resonance frequencies for efficient operation of the microfluidic device.

Figure 12:
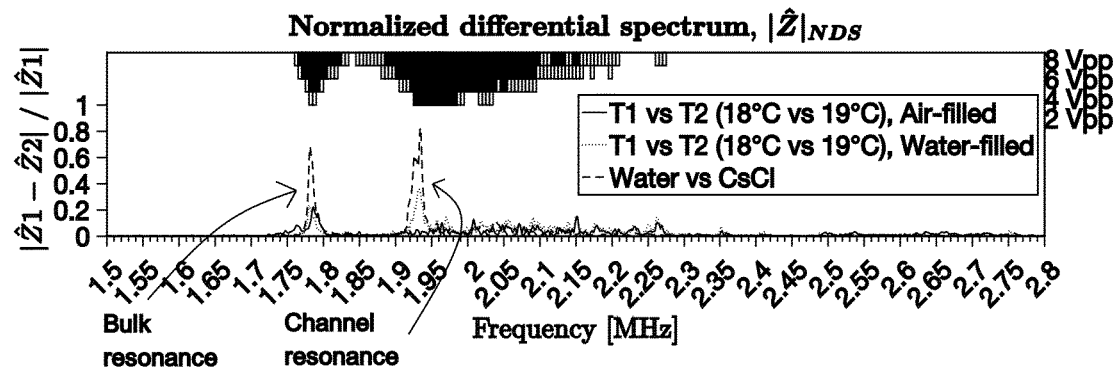
FIG. 12 shows the normalized differential impedance spectra for the acoustofluidic device with the channel filled with water or air obtained with a 1° C. temperature difference (18° C. vs. 19° C.) compared to the normalized differential impedance spectra with the channel filled with water or CsCl-solution, and to the observed resonance frequencies for efficient operation of the acoustofluidic device.

FIG. 12 shows such a comparison made for device 2 at 18° C. vs. 19° C. Here it is noted that the normalized differential spectrum for the air-filled channel provides a peak at about 1.78 MHz (marked in the graph as bulk resonance) and no significant peak at 1.93 MHz.

On the other hand the normalized differential spectrum for the water-filled channel provides both a peak at about 1.78 MHz, i.e. the bulk resonance, and a peak at 1.93 MHz, which later peak must then be associated with resonance due to water being present in the channel (marked in the graph as channel resonance). Using a method of subtracting the normalized differential spectrum for the air-filled channel from the normalized differential spectrum for the water-filled channel would then allow distinguishing the channel resonance. The peaks in the resulting spectrum would then allow the prediction of resonance frequencies for efficient operation of the microfluidic device. The result for device 2 is shown in FIG. 13B, as explained below.

4.4 Evaluation of the Difference Between a Normalized Differential Spectrum Obtained for a Water-Filled Channel at Different Temperatures and a Normalized Differential Spectrum Obtained for an Air-Filled Channel at Different Temperatures In order to test the method defined outlined above, the difference between the normalized differential spectra of each device with the channel filled with water compared to the normalized differential spectra of each device with the channel filled with air, at the temperatures used in section 4.3, was plotted in FIGS. 13A-13G.

Figure 13A:
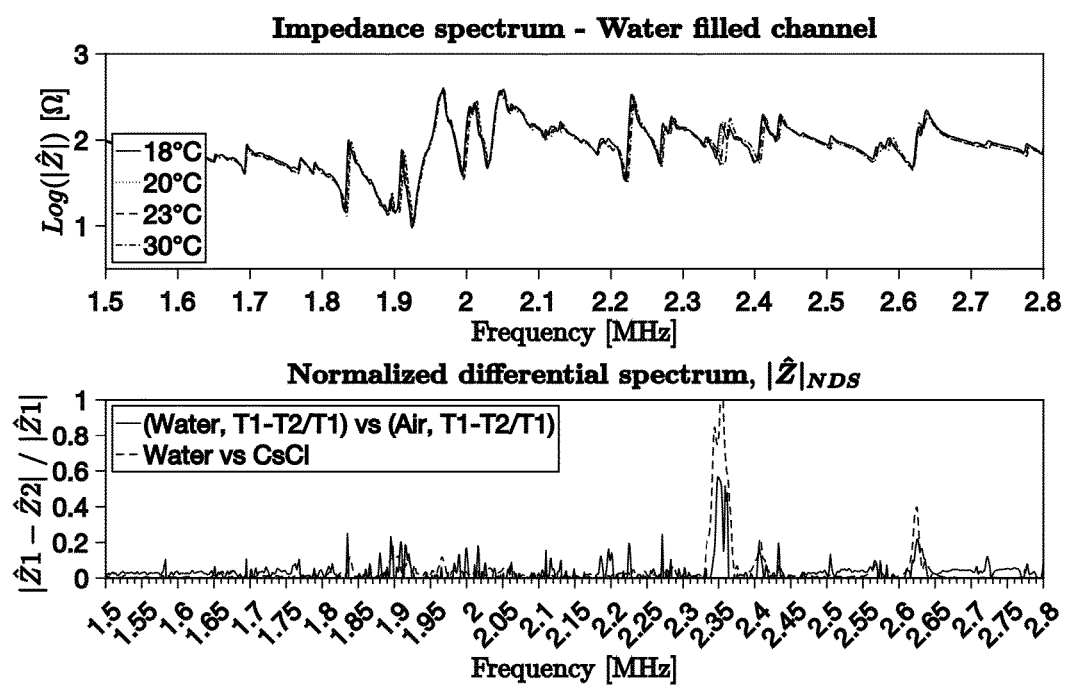
FIG. 13 shows the normalized differential impedance spectra for the acoustofluidic device with the channel filled with water or air obtained with the same temperature differences as in FIG. 11 compared to the normalized differential impedance spectra with the channel filled with water or CsCl-solution.
Figure 13B:
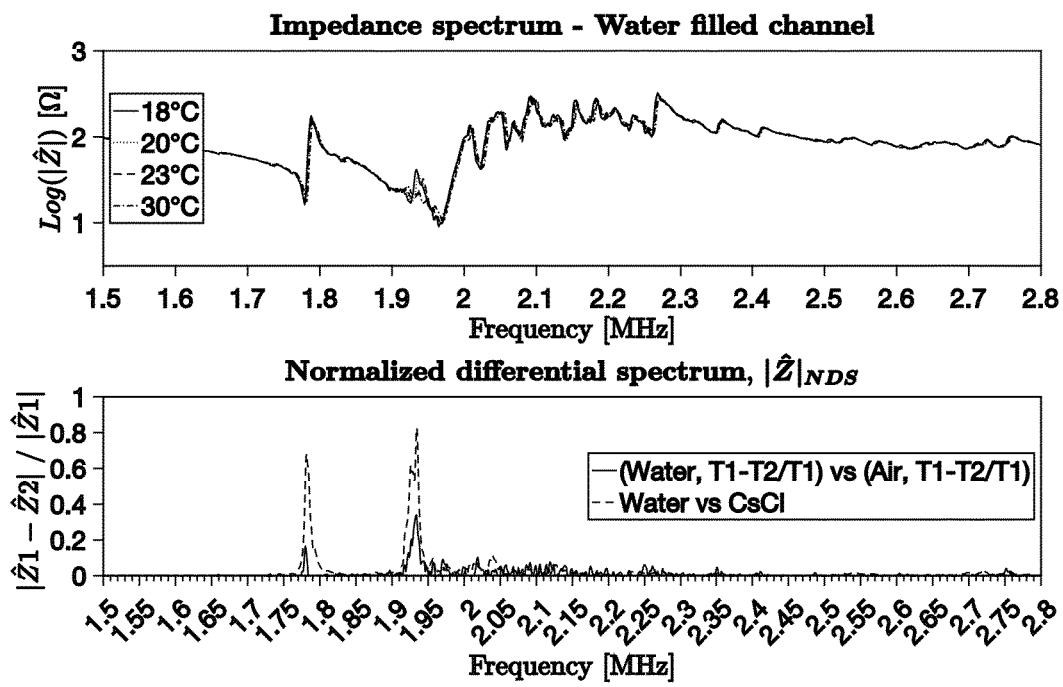

Thus FIG. 13A shows the results for device 1. Note in particular that while the highest peaks (see peaks at about 1.82, 1.9 and 2.2 MHz) of the normalized differential spectra for water and air at different temperatures in FIG. 11A did not correspond to the observed resonance frequencies, the difference of these normalized differential spectra now in FIG. 13A corresponds to the observed resonance frequencies, as well as to the resonance frequencies predicted by the highest peaks of the normalized differential spectra of CsCl-solution vs water at 2.35 MHz. There is thus in FIG. 13A only one major peak at 2.35 MHz which, as the similar peak in the CsCl-solution vs water normalized differential spectrum, predicts the resonance frequency.

Accordingly a method according to a first alternative embodiment of the presentation invention allows the prediction of one or more efficient operation of an acoustofluidic cavity using liquid (e.g. water) and air in the channel, and using two different temperatures of the acoustofluidic device and the liquid and air.

Further, FIG. 13B shows for device 2 how the peaks found by the difference of the normalized differential spectra for water and air at different temperatures corresponding to the highest peaks of the normalized differential spectra of CsCl-solution vs water at 1.79 and 1.93 MHz, which corresponds to observed resonance frequencies (not shown in FIG. 13B).

Figure 13C:
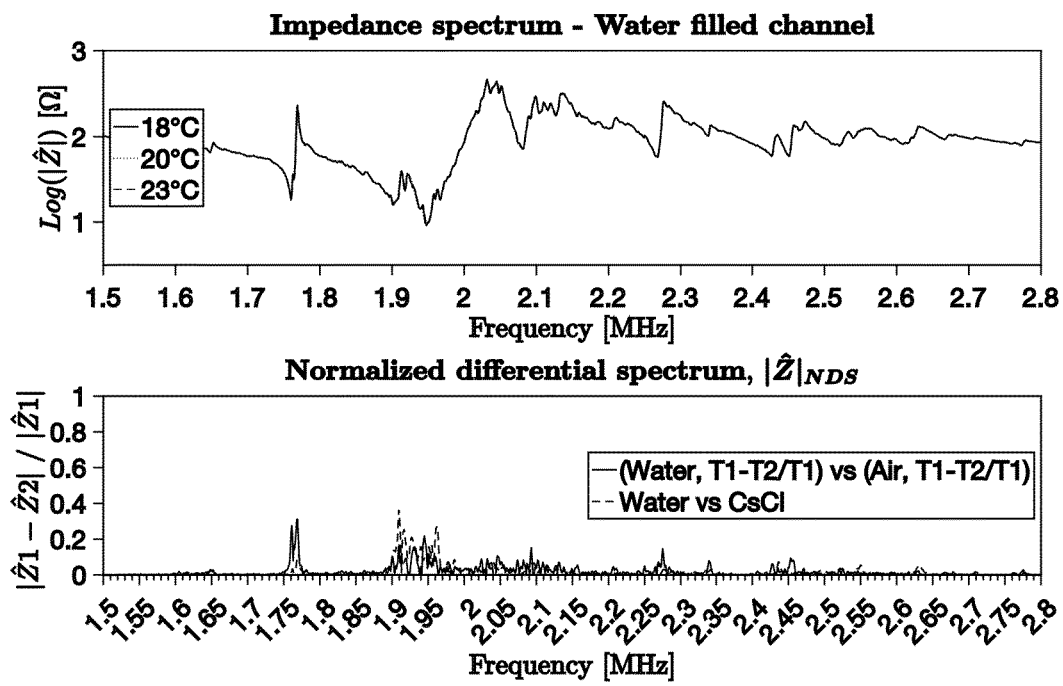
Figure 13D:
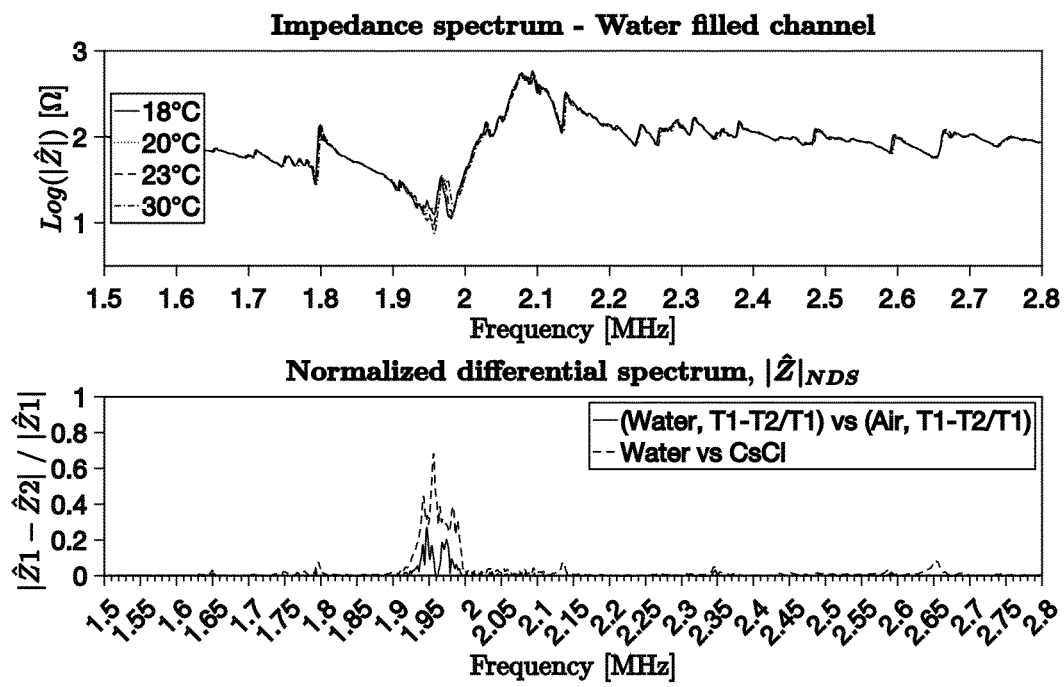
Figure 13E:
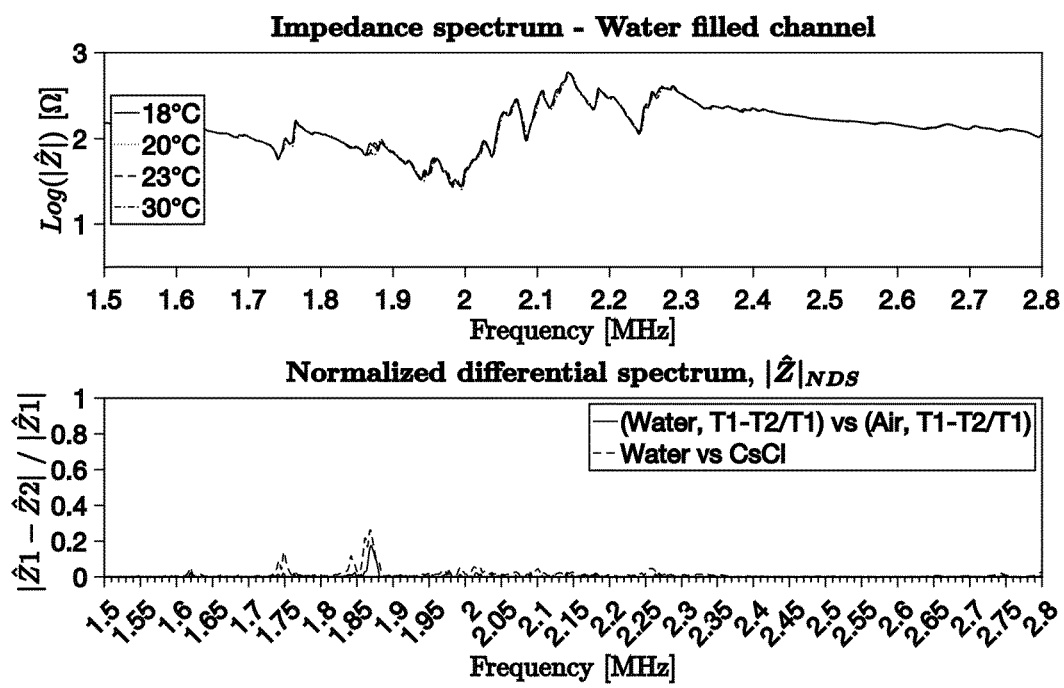
Figure 13F:
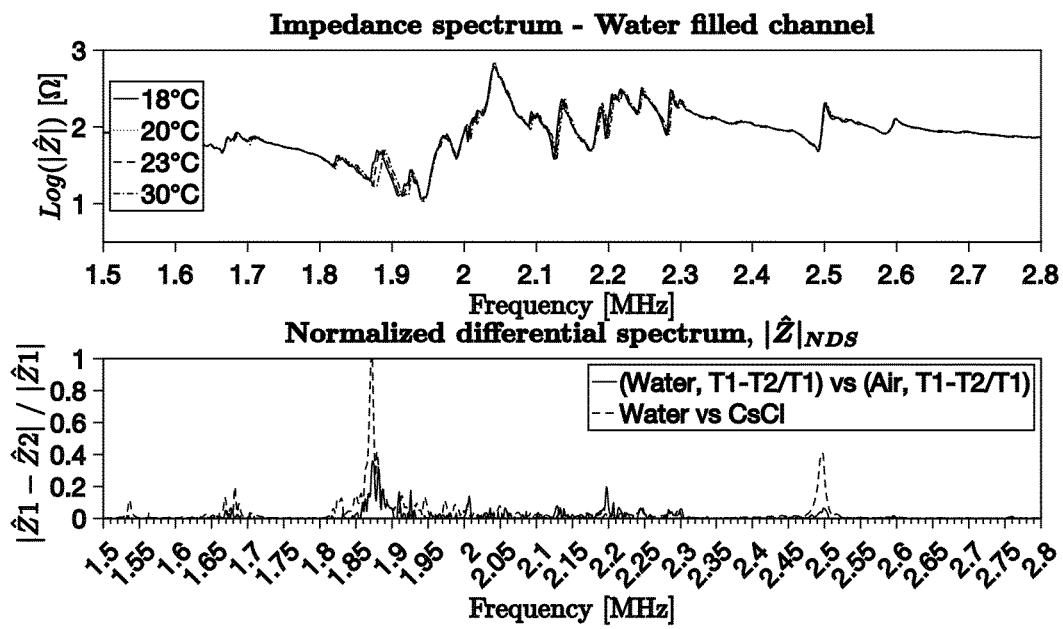
Figure 13G:
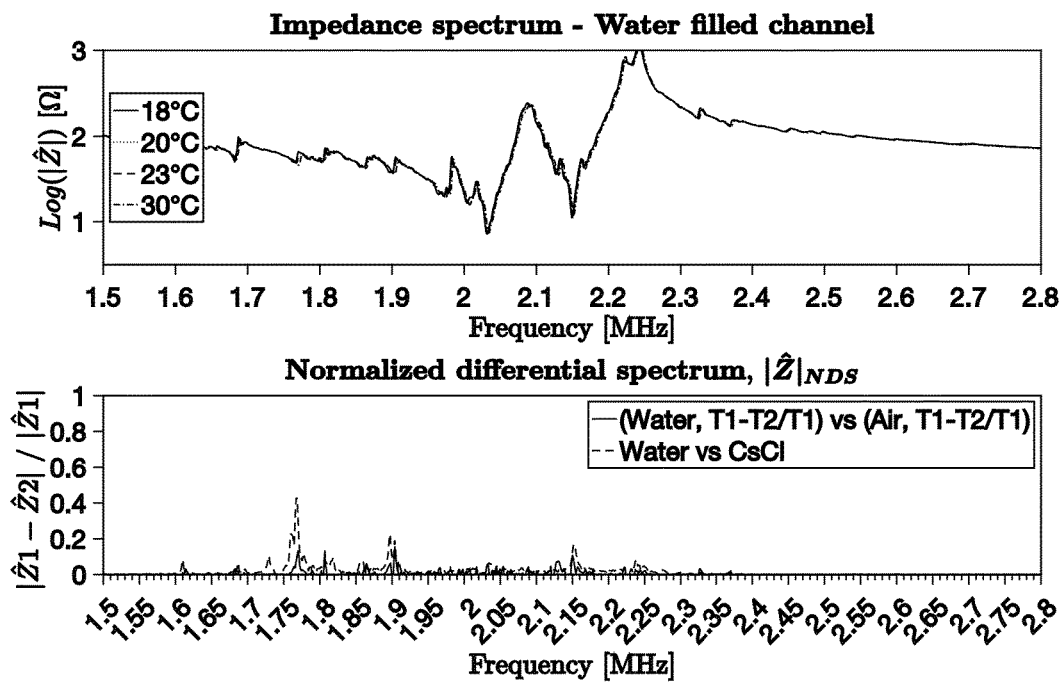

Similarly FIG. 13C shows the results for device 3, FIG. 13D shows the results for device 4, FIG. 13E shows the results for device 5, FIG. 13F shows the results for device 6, and FIG. 13G shows the results for device 7.

Figure 14:
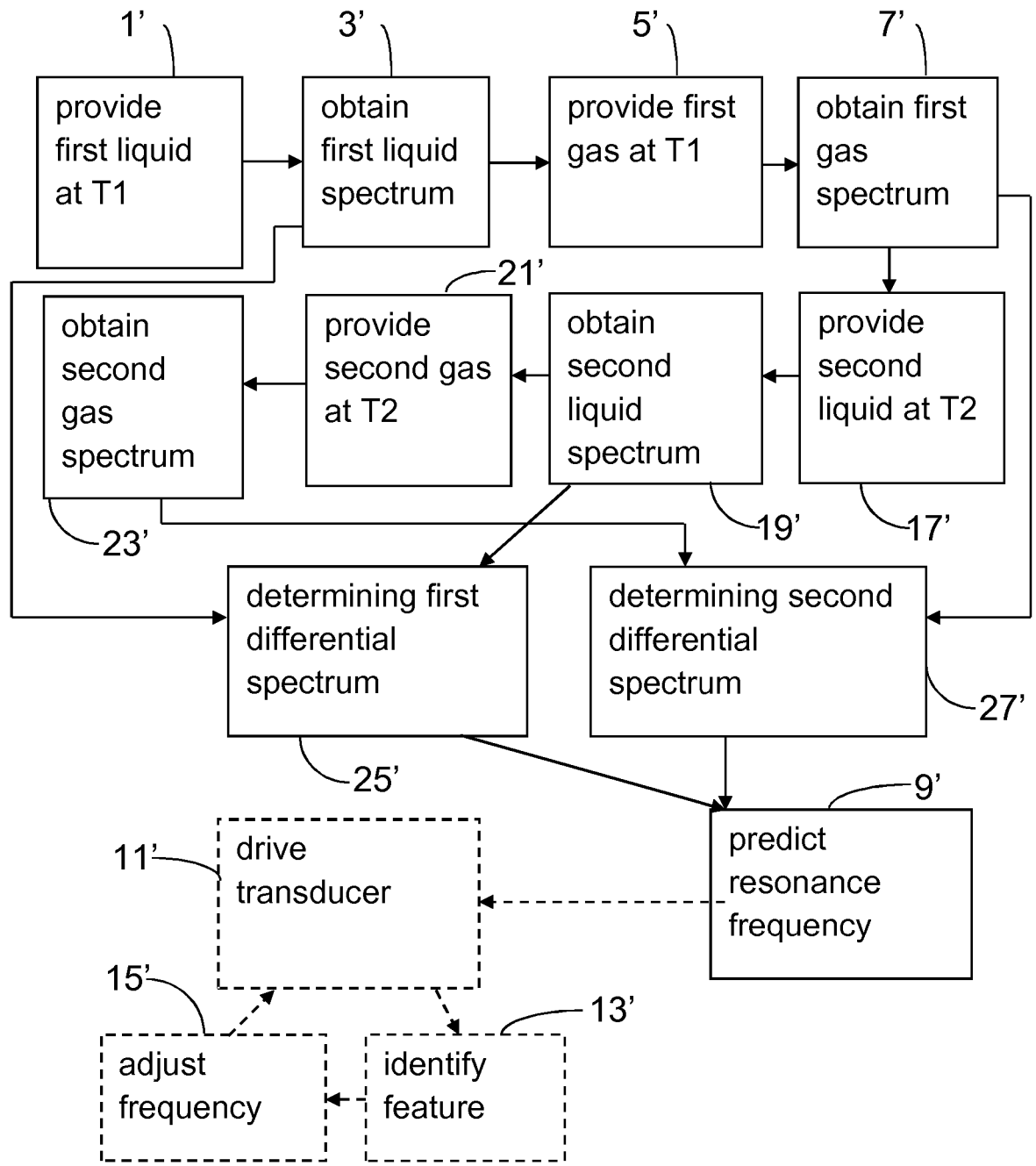
FIG. 14 shows shows a flow sheet for the methods according to the first and second alternative aspects of the present invention.

A general flow sheet of the method according to the first alternative aspect of the present invention is shown in FIG. 14 showing the steps of providing 1 a first liquid filling the cavity at temperature T1, obtaining 3' a first liquid impedance spectrum, by measuring the electrical impedance of an ultrasound transducer connected to the acoustofluidic device as the transducer is driven at a range of frequencies to supply ultrasound energy to the acoustofluidic device with the first liquid filling the cavity at T1, providing 5' a first gas filling the cavity at T1, obtaining 7' a first gas impedance spectrum, by measuring the electrical impedance of the ultrasound transducer as the ultrasound transducer is driven at the range of frequencies to supply ultrasound energy to the acoustofluidic device with the first gas filling the cavity. Thereafter the temperature is changed to T2, and a second liquid is provided in step 17', a second liquid impedance spectrum is obtained 19', a second gas is provided at T2 21', and a second gas impedance spectrum is obtained in 23'. Thereafter first and second differential impedance spectra are obtained 25' and 27', from which the one or more resonance frequencies are predicted 9'.

The method according to the second alternative aspect of the present invention further includes driving 11' the ultrasound transducer of the acoustofluidic device with:
  a. at least one frequency within 90% to 110% of one or more of the predicted resonance frequencies, or
  b. a frequency sweep encompassing a frequency within 90% to 110% of one or more of the predicted resonance frequencies, and may additionally include the steps of identifying 13' a feature, such as a peak or dip, in an electrical impedance spectrum of the ultrasound transducer, the feature being present at the one or more predicted resonance frequencies, and repeatedly adjusting 15' the at least one frequency or the frequency sweep based on following the position, in terms of frequency, of the feature, if the position changes.

Figure 15:
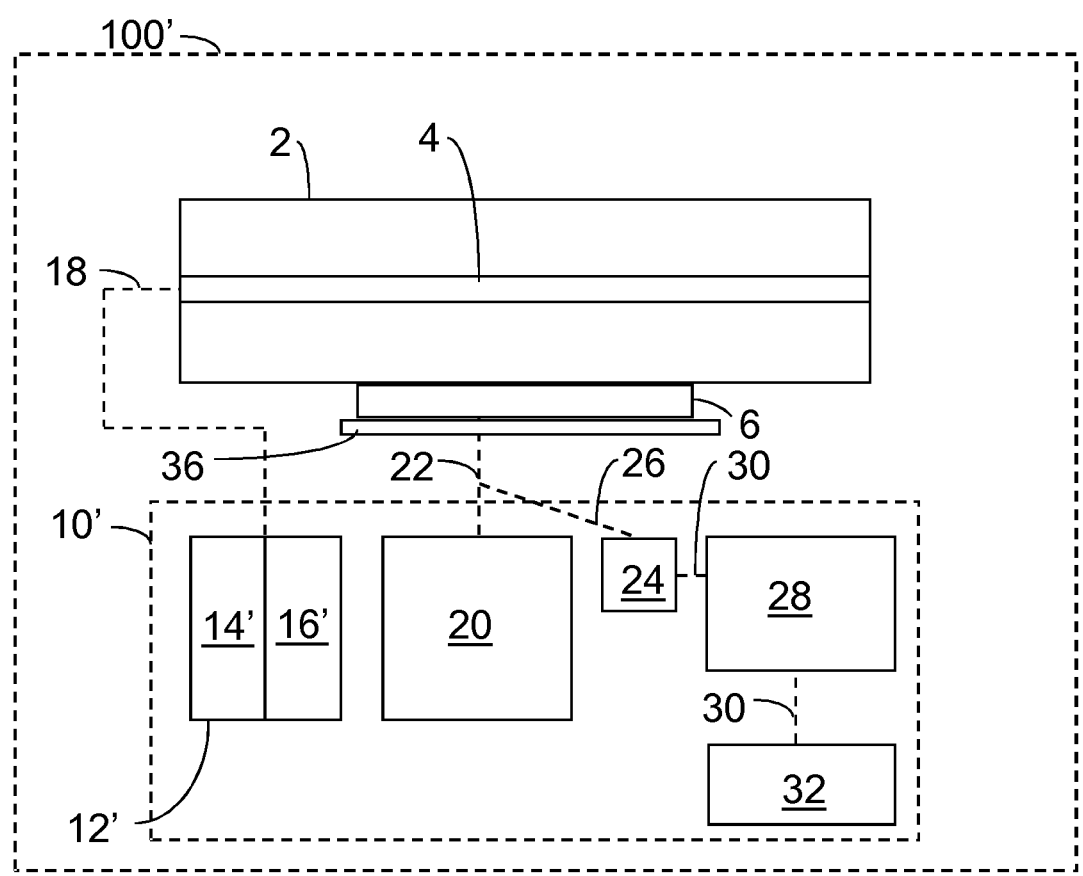
FIG. 15 shows shows apparatuses according to the third and fourth alternative aspects of the present invention.

FIG. 15 shows apparatuses according to the third and fourth alternative aspects of the present invention.

An apparatus 10' for predicting one or more resonance frequencies for efficient operation of an acoustofluidic cavity 4 in an acoustofluidic device 2 is shown. The apparatus 10' corresponds to the apparatus 10 in FIG. 10 with the addition of a peltier element 36, representing a temperature control device, being attached to the ultrasound transducer 6. Peltier element 36 is used to control the temperature of the acoustofluidic device 2 to the first and second temperatures T1 and T2.

Apparatus 10' further employs a modified device 12' for providing liquid 14' (in this case the first and second liquids are the same liquid 14') and gas 16' (in this case the first and second gasses are the same 16') liquid filling the acoustofluidic cavity. The apparatus 10' is used as described above with reference to FIG. 14.

An apparatus 100' configured to perform an acoustofluidic operation and comprising the apparatus 10' is also shown in FIG. 15.

Feasible Modifications of the Invention

The invention is not limited only to the embodiments described above and shown in the drawings, which primarily have an illustrative and exemplifying purpose. This patent application is intended to cover all adjustments and variants of the preferred embodiments described herein, thus the present invention is defined by the wording of the appended claims and the equivalents thereof.

It shall also be pointed out that all information about/concerning terms such as above, under, upper, lower, etc., shall be interpreted/read having the equipment oriented according to the figures, having the drawings oriented such that the references can be properly read. Thus, such terms only indicates mutual relations in the shown embodiments, which relations may be changed if the inventive equipment is provided with another structure/design.

The invention claimed is:

1. A method of predicting one or more resonance frequencies for efficient operation of an acoustofluidic cavity, such as a channel, in an acoustofluidic device, the method comprising the steps of i. filling the cavity with a first liquid;
 ii. obtaining a first impedance spectrum by measuring the electrical impedance of an ultrasound transducer connected to the acoustofluidic device as the transducer is driven at a range of frequencies to supply ultrasound energy to the acoustofluidic device with the first liquid filling the cavity;
 iii. filling the cavity with a second liquid, wherein the second liquid differs from the first liquid in at least one acoustophysical property
 iv. obtaining a second impedance spectrum by measuring the electrical impedance of the ultrasound transducer as the ultrasound transducer is driven at the range of frequencies to supply ultrasound energy to the acoustofluidic device with the second liquid filling the cavity; and
 v. predicting the one or more resonance frequencies for efficient operation of the acoustofluidic cavity by comparing the first impedance spectrum and the second impedance spectrum and selecting the one or more frequencies wherein an absolute value of the difference between the first and second impedance spectra, normalized by the absolute value of one of them, is largest.

2. The method according to claim 1, wherein, in the first impedance spectrum, a complex valued impedance $\hat{Z}_1$ for each frequency is given by $$\hat{Z}_1 = |\hat{Z}_1| \exp\left(\frac{i\varphi_1 \pi}{180°}\right)$$

and wherein, in the second impedance spectrum, the complex valued impedance $\hat{Z}_2$ for each frequency is given by $$\hat{Z}_2 = |\hat{Z}_2| \exp\left(\frac{i\varphi_2 \pi}{180°}\right)$$

where $|\hat{Z}_1|$ and $|\hat{Z}_2|$ is the impedance magnitude and $\varphi_1$ and $\varphi_2$ is the phase angle for the respective spectra, and wherein step (v) comprises determining the frequencies corresponding to the largest values in the normalized differential absolute impedance spectrum, wherein, in the normalized differential absolute value impedance spectrum, the normalized differential absolute impedance $|\hat{Z}|_{NDS}$ for each frequency is given by:

$|\hat{Z}|_{NDS} = |\hat{Z}_1 - \hat{Z}_2|/|\hat{Z}_1|$.

3. The method according to claim 1, wherein the density of the second liquid is at least 2% and no more than 21% different from the density of the first liquid.

4. The method according to claim 1, wherein an expected cavity resonance frequency $f_{exp}$ is determined by the relation $f_{exp} = cn/2d$ where c is the speed of sound in a liquid intended to be subjected to an acoustofluidic operation in the acoustofluidic device, n is an integer, and d is a dimension of the acoustofluidic cavity, wherein the range of frequencies spans from a frequency that is 80% of the expected cavity resonance $f_{exp}$ to a frequency that is 140% of the expected cavity resonance $f_{exp}$.

5. The method according to claim 1, wherein the acoustofluidic device comprises:
  a substrate in which the acoustofluidic cavity is provided; and
  a glass lid bonded to the substrate so as to cover the acoustofluidic cavity.

6. The method according to claim 1, further including the step of:
   vi. driving the ultrasound transducer of the acoustofluidic device with at least one frequency within 90% to 110% of one or more of the predicted resonance frequencies.

7. The method of claim 6, further including the steps of:
   vii. identifying a feature in an electrical impedance spectrum of the ultrasound transducer, the feature being present at the one or more predicted resonance frequencies; and
   viii. repeatedly adjusting the at least one frequency based on following the position, in terms of frequency, of the feature, if the position changes.

8. The method according to claim 1, further including the step of:
   vi. performing a frequency sweep encompassing a frequency within 90% to 110% of one or more of the predicted resonance frequencies.

9. The method of claim 8, further including the steps of:
   vii. identifying a feature in an electrical impedance spectrum of the ultrasound transducer, the feature being present in the frequency sweep; and
   viii. repeatedly adjusting the frequency sweep based on following the position, in terms of frequency, of the feature, if the position changes.

10. An apparatus for predicting one or more resonance frequencies for efficient operation of an acoustofluidic cavity in an acoustofluidic device, the apparatus comprising:
   a device configured to sequentially fill the acoustofluidic cavity with a first liquid and a second liquid, wherein the second liquid differs from the first liquid in at least one acoustophysical property;
   a drive unit configured to drive an ultrasound transducer connected to the acoustofluidic device at a range of frequencies to supply ultrasound energy to the acoustofluidic device;
   an impedance sensing unit electrically connected to the drive unit and configured to obtain first and second impedance spectra, by measuring the impedance of the ultrasound transducer as it is driven over the range of frequencies, when the cavity is filed with first liquid and the second, respectively; and
   a computing device configured to predict one or more resonance frequencies for efficient operation of the acoustofluidic cavity by comparing the first and second impedance spectra and selecting the frequencies where the absolute value of the difference between the first and second impedance spectra, normalized by the absolute value of one of them, is largest.

11. An apparatus comprising an acoustofluidic device with an acoustofluidic cavity, the apparatus being configured to perform an acoustofluidic operation in the acoustofluidic cavity, wherein the apparatus comprises:
   an ultrasound transducer connected to the acoustofluidic device so as to perform the acoustofluidic operation;
   a device configured to sequentially to fill the acoustofluidic cavity with a first liquid and a second liquid, wherein the second liquid differs from the first liquid in at least one acoustophysical property;
   a drive unit configured to drive an ultrasound transducer connected to the acoustofluidic device at a range of frequencies to supply ultrasound energy to the acoustofluidic device;
   an impedance sensing unit electrically connected to the drive unit and configured to obtain first and second impedance spectra, by measuring the impedance of the ultrasound transducer as it is driven over the range of frequencies, when the cavity is filed with first liquid and the second, respectively; and
   a computing device configured to predict one or more resonance frequencies for efficient operation of the acoustofluidic cavity by comparing the first and second impedance spectra and selecting the frequencies where the absolute value of the difference between the first and second impedance spectra, normalized by the absolute value of one of them, is largest;
   wherein the drive unit is electrically connected to the ultrasound transducer, and
   wherein the apparatus is further configured to perform the acoustofluidic operation by one of (a) driving the ultrasound transducer with at least one frequency within 90% to 110% of one or more of the predicted resonance frequencies, and (b) driving the ultrasound transducer with a frequency sweep encompassing a frequency within 90% to 110% of one or more of the predicted resonance frequencies.

12. A method of predicting one or more resonance frequencies for efficient operation of an acoustofluidic cavity, the method comprising the steps of:
   i. setting the temperature of the acoustofluidic device to a first temperature $T1$;
   ii. filling the cavity with a first liquid and allowing the liquid to reach the first temperature $T1$;
   iii. obtaining a first liquid impedance spectrum by measuring the electrical impedance of an ultrasound transducer connected to the acoustofluidic device as the transducer is driven at a range of frequencies to supply ultrasound energy to the acoustofluidic device with the first liquid at the first temperature $T1$ filling the cavity;
   iv. filling the cavity with a first gas filling and allowing the first gas to reach the first temperature $T1$;
   v. obtaining a first gas impedance spectrum by measuring the electrical impedance of an ultrasound transducer connected to the acoustofluidic device as the transducer is driven at a range of frequencies to supply ultrasound energy to the acoustofluidic device with the first gas at the first temperature $T1$ filling the cavity;
   vi. setting the temperature of the acoustofluidic device to a second temperature $T2$, which second temperature $T2$ is different from the first temperature $T1$;
   vii. filling the cavity with a second liquid and allowing the second liquid to reach the second temperature $T2$;
   viii. obtaining a second liquid impedance spectrum by measuring the electrical impedance of an ultrasound transducer connected to the acoustofluidic device as the transducer is driven at a range of frequencies to supply ultrasound energy to the acoustofluidic device with the second liquid at the second temperature $T2$ filling the cavity;
   ix. filling the cavity with a second gas and allowing the second gas to reach the second temperature $T2$;
   x. obtaining a second gas impedance spectrum by measuring the electrical impedance of an ultrasound transducer connected to the acoustofluidic device as the transducer is driven at a range of frequencies to supply ultrasound energy to the acoustofluidic device with the second gas at the second temperature $T2$ filling the cavity;
   xi. determining a first differential impedance spectrum from the first and the second liquid impedance spectra;
   xii. determining a second differential impedance spectrum from the first and the second gas impedance spectra; and i. predicting the one or more resonance frequencies for efficient operation of the acoustofluidic cavity by comparing the first and second differential impedance spectra and selecting the one or more frequencies where the first and second differential impedance spectra differ the most.

13. The method according to claim 12, wherein:
the first differential impedance spectrum is a first normalized differential absolute impedance spectrum; and
the second differential impedance spectrum is a second normalized differential absolute impedance spectrum.

14. The method according to claim 12, wherein the first liquid and the second liquid have the same acoustophysical properties.

15. The method according to claim 12, where the second gas is the same as the first gas.

16. The method according to claim 12, wherein the difference between the first temperature T1 and the second temperature T2 is at least 0.5° C.

17. The method according to claim 12, wherein the difference between the first and second normalized differential absolute impedance spectra is obtained by subtracting the second normalized differential absolute impedance spectrum from the first normalized differential absolute impedance spectrum.

18. The method according to claim 12, further comprising the step of driving the ultrasound transducer of the acoustofluidic device with at least one frequency within 90% to 110% of one or more of the predicted resonance frequencies.

19. The method according to claim 18, further comprising the step of performing a frequency sweep encompassing a frequency within 90% to 110% of one or more of the predicted resonance frequencies.

20. The method according to claim 19, further comprising the steps of:
Identifying a feature in an electrical impedance spectrum of the ultrasound transducer, the feature being present at the one or more predicted resonant frequencies; and
repeatedly adjusting the frequency sweep based on following the position, in terms of frequency, of the feature, if the position changes.

21. The method according to claim 18, further comprising the steps of:
identifying a feature in an electrical impedance spectrum of the ultrasound transducer, the feature being present at the one or more predicted resonance frequencies; and
repeatedly adjusting the at least one frequency based on following the position, in terms of frequency, of the feature, if the position changes.

22. An apparatus for predicting one or more resonance frequencies for efficient operation of an acoustofluidic cavity in an acoustofluidic device, the apparatus comprising:
a device configured to selectively provide a first liquid, a second liquid, a first gas, and a second gas filling the acoustofluidic cavity;
a temperature control device configured to selectively control the temperature of the acoustofluidic device to a first temperature T1 and a second temperature T2, respectively;
a drive unit configured to drive an ultrasound transducer connected to the acoustofluidic device at a range of frequencies to supply ultrasound energy to the acoustofluidic device;
an impedance sensing unit electrically connected to the drive unit and configured to obtain first and second liquid impedance spectra, and first and second gas impedance spectra, by measuring the impedance of the ultrasound transducer as it is driven over the range of frequencies, when the first liquid and the second liquid, respectively, and the first gas and the second gas, respectively, fill the cavity at the first temperature T1 and the second temperature T2, respectively; and
a computing device configured to determine first and second differential impedance spectra, and further configured to predict the one or more resonance frequencies for efficient operation of the acoustofluidic cavity, by comparing the first and second differential impedance spectra and selecting the one or more frequencies where the first and second differential impedance spectra differ the most.

23. A system for performing an acoustofluidic operation in an acoustofluidic cavity in an acoustofluidic device, the system comprising:
an ultrasound transducer connected to the acoustofluidic device;
a device configured to selectively provide a first liquid, a second liquid, a first gas, and a second gas filling the acoustofluidic cavity;
a temperature control device configured to selectively control the temperature of the acoustofluidic device to a first temperature T1 and a second temperature T2, respectively;
a drive unit configured to drive an ultrasound transducer connected to the acoustofluidic device at a range of frequencies to supply ultrasound energy to the acoustofluidic device;
an impedance sensing unit electrically connected to the drive unit and configured to obtain first and second liquid impedance spectra, and first and second gas impedance spectra, by measuring the impedance of the ultrasound transducer as it is driven over the range of frequencies, when the first liquid and the second liquid, respectively, and the first gas and the second gas, respectively, fill the cavity at the first temperature T1 and the second temperature T2, respectively; and
a computing device configured to determine first and second differential impedance spectra, and further configured to predict the one or more resonance frequencies for efficient operation of the acoustofluidic cavity, by comparing the first and second differential impedance spectra and selecting the one or more frequencies where the first and second differential impedance spectra differ the most;
wherein the drive unit is electrically connected to the ultrasound transducer; and
wherein the system is further configured to perform the acoustofluidic operation by driving the ultrasound transducer with one of (a) at least one frequency within 90% to 110% of one or more of the predicted resonance frequencies, and (b) a frequency sweep encompassing a frequency within 90% to 110% of one or more of the predicted resonance frequencies.

* * * * *